(12) United States Patent
White et al.

(10) Patent No.: US 11,316,974 B2
(45) Date of Patent: Apr. 26, 2022

(54) CLOUD-BASED ASSISTIVE SERVICES FOR USE IN TELECOMMUNICATIONS AND ON PREMISE DEVICES

(71) Applicant: Ooma, Inc., Sunnyvale, CA (US)

(72) Inventors: Thaddeus White, Los Altos, CA (US); Karl Osterlund, San Jose, CA (US); Tobin E. Farrand, Pacific Grove, CA (US); Arvind Vasudev, Sunnyvale, CA (US); Douglas E. Hart, San Jose, CA (US); David A. Bryan, Cedar Park, TX (US); William M. Gillon, San Mateo, CA (US)

(73) Assignee: Ooma, Inc., Sunnyvale, CA (US)

( * ) Notice: Subject to any disclaimer, the term of this patent is extended or adjusted under 35 U.S.C. 154(b) by 0 days.

(21) Appl. No.: 16/791,959

(22) Filed: Feb. 14, 2020

(65) Prior Publication Data

US 2020/0186644 A1 Jun. 11, 2020

Related U.S. Application Data

(63) Continuation of application No. 15/884,294, filed on Jan. 30, 2018, which is a continuation-in-part of (Continued)

(51) Int. Cl.
*G08B 17/00* (2006.01)
*H04M 3/42* (2006.01)
(Continued)

(52) U.S. Cl.
CPC ........ *H04M 3/42102* (2013.01); *G06F 3/167* (2013.01); *G10L 15/26* (2013.01);
(Continued)

(58) Field of Classification Search
CPC ... H04M 3/42102; H04M 3/527; G06F 3/167; G10L 15/265; H04L 12/281;
(Continued)

(56) References Cited

U.S. PATENT DOCUMENTS

| 5,323,444 A | 6/1994 | Ertz et al. |
| 5,425,085 A | 6/1995 | Weinberger et al. |

(Continued)

FOREIGN PATENT DOCUMENTS

| CA | 2949211 C | 2/2019 |
| CA | 2954351 C | 4/2020 |

(Continued)

OTHER PUBLICATIONS

Christensen et al., Voice-enabled IT transformation The new voice technologies (Year: 2007).*

(Continued)

*Primary Examiner* — Quang Pham
(74) *Attorney, Agent, or Firm* — Carr & Ferrell LLP

(57) ABSTRACT

Cloud-based assistive services for use in telecommunications and on premise devices are disclosed herein. An example method includes: operating in a monitoring state to actively monitor for a first predetermined action, receiving an audio stream based on communications between a first party and a second party, identifying the first predetermined action, establishing one- or two-way communications with any of the first party or the second party in response to the first predetermined action, determining a request for the intelligent personal assistant service in the one- or two-way communications, generating a result by the intelligent personal assistant service, the result being responsive to the request, providing the result to any of the first party and the second party, receiving a second predetermined action from any of the first party and the second party, and returning the (Continued)

intelligent personal assistant service to the monitoring state based on the second predetermined action.

19 Claims, 7 Drawing Sheets

Related U.S. Application Data application No. 14/327,163, filed on Jul. 9, 2014, now Pat. No. 10,553,098.

(51) Int. Cl.
*H04L 12/28* (2006.01)
*G06F 3/16* (2006.01)
*H04M 3/527* (2006.01)
*G10L 15/26* (2006.01)

(52) U.S. Cl.
CPC .......... *H04L 12/281* (2013.01); *H04L 12/282* (2013.01); *H04L 12/283* (2013.01); *H04M 3/527* (2013.01); *G08C 2201/31* (2013.01); *H04L 2012/2841* (2013.01)

(58) Field of Classification Search
CPC ................. H04L 12/282; H04L 12/283; H04L 2012/2841; G08C 2201/31
See application file for complete search history.

(56) References Cited

U.S. PATENT DOCUMENTS

| | | |
|---|---|---|
| 5,463,595 A | 10/1995 | Rodhall et al. |
| 5,519,769 A | 5/1996 | Weinberger et al. |
| 5,596,625 A | 1/1997 | LeBlanc |
| 5,598,460 A | 1/1997 | Tendler |
| 5,796,736 A | 8/1998 | Suzuki |
| 5,999,611 A | 12/1999 | Tatchell et al. |
| 6,023,724 A | 2/2000 | Bhatia et al. |
| 6,128,481 A | 10/2000 | Houde et al. |
| 6,148,190 A | 11/2000 | Bugnon et al. |
| 6,201,856 B1 | 3/2001 | Orwick et al. |
| 6,202,169 B1 | 3/2001 | Razzaghe-Ashrafi et al. |
| 6,266,397 B1 | 7/2001 | Stoner |
| 6,377,938 B1 | 4/2002 | Block et al. |
| 6,487,197 B1 | 11/2002 | Elliott |
| 6,594,246 B1 | 7/2003 | Jorgensen |
| 6,615,264 B1 | 9/2003 | Stoltz et al. |
| 6,661,340 B1 | 12/2003 | Saylor et al. |
| 6,690,932 B1 | 2/2004 | Barnier et al. |
| 6,697,358 B2 | 2/2004 | Bernstein |
| 6,714,545 B1 | 3/2004 | Hugenberg et al. |
| 6,757,362 B1 * | 6/2004 | Cooper ................. H04M 3/527 379/88.01 |
| 6,775,267 B1 | 8/2004 | Kung et al. |
| 6,778,517 B1 | 8/2004 | Lou et al. |
| 6,778,528 B1 | 8/2004 | Blair et al. |
| 6,781,983 B1 | 8/2004 | Armistead |
| 6,914,900 B1 | 7/2005 | Komatsu et al. |
| 6,934,258 B1 | 8/2005 | Smith et al. |
| 7,113,090 B1 | 9/2006 | Saylor et al. |
| 7,124,506 B2 | 10/2006 | Yamanashi et al. |
| 7,127,043 B2 | 10/2006 | Morris |
| 7,127,506 B1 | 10/2006 | Schmidt et al. |
| 7,154,891 B1 | 12/2006 | Callon |
| 7,280,495 B1 | 10/2007 | Zweig et al. |
| 7,295,660 B1 | 11/2007 | Higginbotham et al. |
| 7,342,925 B2 | 3/2008 | Cherchali et al. |
| 7,376,124 B2 | 5/2008 | Lee et al. |
| 7,394,803 B1 | 7/2008 | Petit-Huguenin et al. |
| 7,599,356 B1 | 10/2009 | Barzegar et al. |
| 7,733,859 B2 | 6/2010 | Takahashi et al. |
| 7,844,034 B1 | 11/2010 | Oh et al. |
| 7,969,296 B1 | 6/2011 | Stell |
| 8,098,798 B2 | 1/2012 | Goldman et al. |
| 8,140,392 B2 | 3/2012 | Altberg et al. |
| 8,180,316 B2 | 5/2012 | Hwang |
| 8,208,955 B1 | 6/2012 | Nelson |
| 8,331,547 B2 | 12/2012 | Smith et al. |
| 8,350,694 B1 | 1/2013 | Trundle et al. |
| 8,515,021 B2 | 8/2013 | Farrand et al. |
| 8,577,000 B1 | 11/2013 | Brown |
| 8,634,520 B1 | 1/2014 | Morrison et al. |
| 8,837,698 B2 | 9/2014 | Altberg et al. |
| 8,988,232 B1 | 3/2015 | Sloo et al. |
| 9,080,782 B1 | 7/2015 | Sheikh |
| 9,087,515 B2 | 7/2015 | Tsuda |
| 9,119,236 B1 | 8/2015 | Martin |
| 9,147,054 B1 | 9/2015 | Beal et al. |
| 9,179,279 B2 | 11/2015 | Zussman |
| 9,225,626 B2 | 12/2015 | Capper et al. |
| 9,386,148 B2 | 7/2016 | Farrand et al. |
| 9,386,414 B1 | 7/2016 | Mayor et al. |
| 9,418,658 B1 * | 8/2016 | David ..................... G10L 15/26 |
| 9,426,288 B2 | 8/2016 | Farrand et al. |
| 9,521,069 B2 | 12/2016 | Gillon et al. |
| 9,560,198 B2 | 1/2017 | Farrand et al. |
| 9,633,547 B2 | 4/2017 | Farrand et al. |
| 9,667,782 B2 | 5/2017 | Farrand et al. |
| 9,697,828 B1 * | 7/2017 | Prasad ..................... G10L 15/18 |
| 9,787,611 B2 | 10/2017 | Gillon et al. |
| 9,826,372 B2 | 11/2017 | Jeong |
| 9,905,103 B2 | 2/2018 | Hsieh |
| 9,929,981 B2 | 3/2018 | Gillon et al. |
| 10,009,286 B2 | 6/2018 | Gillon et al. |
| 10,074,371 B1 | 9/2018 | Wang et al. |
| 10,116,796 B2 | 10/2018 | Im et al. |
| 10,135,976 B2 | 11/2018 | Farrand et al. |
| 10,158,584 B2 | 12/2018 | Gillon et al. |
| 10,192,546 B1 * | 1/2019 | Piersol ..................... G10L 15/08 |
| 10,255,792 B2 | 4/2019 | Farrand et al. |
| 10,263,918 B2 | 4/2019 | Gillon et al. |
| 10,297,250 B1 | 5/2019 | Blanksteen et al. |
| 10,341,490 B2 | 7/2019 | Im et al. |
| 10,469,556 B2 | 11/2019 | Frame et al. |
| 10,553,098 B2 | 2/2020 | Hart et al. |
| 10,580,405 B1 | 3/2020 | Wang et al. |
| 10,593,328 B1 | 3/2020 | Wang et al. |
| 10,706,703 B1 | 7/2020 | Barr |
| 10,714,081 B1 * | 7/2020 | Miller ..................... G10L 15/08 |
| 10,728,386 B2 | 7/2020 | Farrand et al. |
| 10,769,931 B2 | 9/2020 | Krein et al. |
| 10,771,396 B2 | 9/2020 | Osterlund et al. |
| 10,818,158 B2 | 10/2020 | Farrand et al. |
| 10,854,199 B2 * | 12/2020 | Hanes ..................... G06F 1/3206 |
| 10,887,764 B1 * | 1/2021 | Mokady ................... G10L 17/00 |
| 10,911,368 B2 | 2/2021 | Gillon et al. |
| 11,032,211 B2 | 6/2021 | Gillon |
| 11,069,353 B1 | 7/2021 | Gao et al. |
| 11,070,644 B1 | 7/2021 | Teng et al. |
| 11,070,676 B2 | 7/2021 | Klingler et al. |
| 11,094,185 B2 | 8/2021 | Farrand et al. |
| 11,138,384 B2 | 10/2021 | Millius et al. |
| 11,145,203 B2 | 10/2021 | Noy et al. |
| 11,145,294 B2 | 10/2021 | Vescovi et al. |
| 11,159,767 B1 | 10/2021 | Kamisetty et al. |
| 11,176,940 B1 | 11/2021 | Zhong et al. |
| 11,250,687 B2 | 2/2022 | Krein et al. |
| 2001/0024163 A1 | 9/2001 | Petite |
| 2001/0025349 A1 | 9/2001 | Sharood et al. |
| 2001/0053194 A1 | 12/2001 | Johnson |
| 2002/0016718 A1 | 2/2002 | Rothschild et al. |
| 2002/0035556 A1 | 3/2002 | Shah et al. |
| 2002/0037750 A1 | 3/2002 | Hussain et al. |
| 2002/0038167 A1 | 3/2002 | Chirnomas |
| 2002/0057764 A1 | 5/2002 | Salvucci et al. |
| 2002/0085692 A1 | 7/2002 | Katz |
| 2002/0130784 A1 | 9/2002 | Suzuki et al. |
| 2002/0133614 A1 | 9/2002 | Weerahandi et al. |
| 2002/0140549 A1 | 10/2002 | Tseng |
| 2002/0165966 A1 | 11/2002 | Widegren et al. |
| 2003/0027602 A1 | 2/2003 | Han et al. |
| 2003/0058844 A1 | 3/2003 | Sojka et al. |
| 2003/0099334 A1 | 5/2003 | Contractor |

(56) References Cited

U.S. PATENT DOCUMENTS

| | | |
|---|---|---|
| 2003/0119492 A1 | 6/2003 | Timmins et al. |
| 2003/0133443 A1 | 7/2003 | Klinker et al. |
| 2003/0141093 A1 | 7/2003 | Tirosh et al. |
| 2003/0158940 A1 | 8/2003 | Leigh |
| 2003/0164877 A1 | 9/2003 | Murai |
| 2003/0184436 A1 | 10/2003 | Seales et al. |
| 2003/0189928 A1 | 10/2003 | Xiong |
| 2003/0193393 A1 | 10/2003 | Ford |
| 2004/0001512 A1 | 1/2004 | Challener et al. |
| 2004/0010472 A1 | 1/2004 | Hilby et al. |
| 2004/0010569 A1 | 1/2004 | Thomas et al. |
| 2004/0017803 A1 | 1/2004 | Lim et al. |
| 2004/0059821 A1 | 3/2004 | Tang et al. |
| 2004/0062373 A1* | 4/2004 | Baker ............ H04M 3/4931 379/218.01 |
| 2004/0086093 A1 | 5/2004 | Schranz |
| 2004/0090968 A1 | 5/2004 | Kimber et al. |
| 2004/0105444 A1 | 6/2004 | Korotin et al. |
| 2004/0160956 A1 | 8/2004 | Hardy et al. |
| 2004/0235509 A1 | 11/2004 | Burritt et al. |
| 2004/0267385 A1 | 12/2004 | Lingemann |
| 2005/0027887 A1 | 2/2005 | Zimler et al. |
| 2005/0036590 A1 | 2/2005 | Pearson et al. |
| 2005/0053209 A1 | 3/2005 | D'Evelyn et al. |
| 2005/0074114 A1 | 4/2005 | Fotta et al. |
| 2005/0078681 A1 | 4/2005 | Sanuki et al. |
| 2005/0089018 A1 | 4/2005 | Schessel |
| 2005/0097222 A1 | 5/2005 | Jiang et al. |
| 2005/0105708 A1 | 5/2005 | Kouchri et al. |
| 2005/0141485 A1 | 6/2005 | Miyajima et al. |
| 2005/0169247 A1 | 8/2005 | Chen |
| 2005/0180549 A1 | 8/2005 | Chiu et al. |
| 2005/0222820 A1 | 10/2005 | Chung |
| 2005/0238034 A1 | 10/2005 | Gillespie et al. |
| 2005/0238142 A1 | 10/2005 | Winegarden |
| 2005/0246174 A1 | 11/2005 | DeGolia |
| 2005/0259637 A1 | 11/2005 | Chu et al. |
| 2005/0282518 A1 | 12/2005 | D'Evelyn et al. |
| 2005/0287979 A1 | 12/2005 | Rollender |
| 2006/0007915 A1 | 1/2006 | Frame |
| 2006/0009240 A1 | 1/2006 | Katz |
| 2006/0013195 A1 | 1/2006 | Son et al. |
| 2006/0059238 A1 | 3/2006 | Slater et al. |
| 2006/0071775 A1 | 4/2006 | Otto et al. |
| 2006/0092011 A1 | 5/2006 | Simon et al. |
| 2006/0114894 A1 | 6/2006 | Cherchali et al. |
| 2006/0140352 A1 | 6/2006 | Morris |
| 2006/0156251 A1 | 7/2006 | Suhail et al. |
| 2006/0167746 A1 | 7/2006 | Zucker |
| 2006/0187898 A1 | 8/2006 | Chou et al. |
| 2006/0187900 A1 | 8/2006 | Akbar et al. |
| 2006/0206933 A1 | 9/2006 | Molen et al. |
| 2006/0243797 A1 | 11/2006 | Apte et al. |
| 2006/0251048 A1 | 11/2006 | Yoshino et al. |
| 2006/0258341 A1 | 11/2006 | Miller et al. |
| 2006/0259767 A1 | 11/2006 | Mansz et al. |
| 2006/0268828 A1 | 11/2006 | Yarlagadda |
| 2006/0268848 A1 | 11/2006 | Larsson et al. |
| 2007/0030161 A1 | 2/2007 | Yang |
| 2007/0032220 A1 | 2/2007 | Feher |
| 2007/0036314 A1 | 2/2007 | Kloberdans et al. |
| 2007/0037560 A1 | 2/2007 | Yun et al. |
| 2007/0037605 A1 | 2/2007 | Logan |
| 2007/0041517 A1 | 2/2007 | Clarke et al. |
| 2007/0049342 A1 | 3/2007 | Mayer et al. |
| 2007/0054645 A1 | 3/2007 | Pan |
| 2007/0061363 A1 | 3/2007 | Ramer et al. |
| 2007/0061735 A1 | 3/2007 | Hoffberg et al. |
| 2007/0067219 A1 | 3/2007 | Altberg et al. |
| 2007/0071212 A1 | 3/2007 | Quittek et al. |
| 2007/0118750 A1 | 5/2007 | Owen et al. |
| 2007/0121593 A1 | 5/2007 | Vance et al. |
| 2007/0121596 A1 | 5/2007 | Kurapati et al. |
| 2007/0132844 A1 | 6/2007 | Katz |
| 2007/0133757 A1 | 6/2007 | Girouard et al. |
| 2007/0135088 A1 | 6/2007 | Alessandro |
| 2007/0153776 A1 | 7/2007 | Joseph et al. |
| 2007/0165811 A1 | 7/2007 | Reumann et al. |
| 2007/0183407 A1 | 8/2007 | Bennett et al. |
| 2007/0203999 A1 | 8/2007 | Townsley et al. |
| 2007/0220907 A1 | 9/2007 | Ehlers |
| 2007/0223455 A1 | 9/2007 | Chang et al. |
| 2007/0238472 A1 | 10/2007 | Wanless |
| 2007/0255702 A1 | 11/2007 | Orme |
| 2007/0283430 A1 | 12/2007 | Lai et al. |
| 2007/0298772 A1 | 12/2007 | Owens et al. |
| 2008/0016556 A1 | 1/2008 | Selignan |
| 2008/0036585 A1 | 2/2008 | Gould |
| 2008/0049748 A1 | 2/2008 | Bugenhagen et al. |
| 2008/0075248 A1 | 3/2008 | Kim |
| 2008/0075257 A1 | 3/2008 | Nguyen et al. |
| 2008/0084975 A1 | 4/2008 | Schwartz |
| 2008/0089325 A1 | 4/2008 | Sung |
| 2008/0097819 A1 | 4/2008 | Whitman, Jr. |
| 2008/0101338 A1* | 5/2008 | Reynolds ............ H04L 12/66 370/352 |
| 2008/0101378 A1 | 5/2008 | Krueger |
| 2008/0111765 A1 | 5/2008 | Kim |
| 2008/0118039 A1 | 5/2008 | Elliot et al. |
| 2008/0125095 A1 | 5/2008 | Mornhineway et al. |
| 2008/0125964 A1 | 5/2008 | Carani et al. |
| 2008/0144625 A1 | 6/2008 | Wu et al. |
| 2008/0144884 A1 | 6/2008 | Habibi |
| 2008/0159515 A1 | 7/2008 | Rines |
| 2008/0166992 A1 | 7/2008 | Ricordi et al. |
| 2008/0168145 A1 | 7/2008 | Wilson |
| 2008/0196099 A1 | 8/2008 | Shastri |
| 2008/0200142 A1 | 8/2008 | Abdel-Kader et al. |
| 2008/0205386 A1 | 8/2008 | Purnadi et al. |
| 2008/0225749 A1 | 9/2008 | Peng et al. |
| 2008/0247401 A1 | 10/2008 | Bhal et al. |
| 2008/0293374 A1 | 11/2008 | Berger |
| 2008/0298348 A1 | 12/2008 | Frame et al. |
| 2008/0309486 A1 | 12/2008 | McKenna et al. |
| 2008/0310599 A1 | 12/2008 | Purnadi et al. |
| 2008/0313297 A1 | 12/2008 | Heron et al. |
| 2008/0316946 A1 | 12/2008 | Capper et al. |
| 2009/0097474 A1 | 4/2009 | Ray et al. |
| 2009/0106318 A1 | 4/2009 | Mantripragada et al. |
| 2009/0135008 A1 | 5/2009 | Kirchmeier et al. |
| 2009/0140060 A1 | 6/2009 | Stoner et al. |
| 2009/0168755 A1 | 7/2009 | Peng et al. |
| 2009/0171659 A1* | 7/2009 | Pearce ............ H04L 67/02 704/235 |
| 2009/0172131 A1 | 7/2009 | Sullivan |
| 2009/0175165 A1 | 7/2009 | Leighton |
| 2009/0186596 A1 | 7/2009 | Kaltsukis |
| 2009/0213999 A1 | 8/2009 | Farrand et al. |
| 2009/0224931 A1 | 9/2009 | Dietz et al. |
| 2009/0240586 A1 | 9/2009 | Ramer et al. |
| 2009/0253428 A1 | 10/2009 | Bhatia et al. |
| 2009/0261958 A1 | 10/2009 | Sundararajan et al. |
| 2009/0264093 A1 | 10/2009 | Rothschild |
| 2009/0289757 A1 | 11/2009 | Ballard |
| 2009/0295572 A1 | 12/2009 | Grim, III et al. |
| 2009/0303042 A1 | 12/2009 | Song et al. |
| 2009/0319271 A1 | 12/2009 | Gross |
| 2010/0003960 A1 | 1/2010 | Ray et al. |
| 2010/0034121 A1 | 2/2010 | Bozionek |
| 2010/0046530 A1 | 2/2010 | Hautakorpi et al. |
| 2010/0046731 A1 | 2/2010 | Gisby et al. |
| 2010/0077063 A1 | 3/2010 | Amit et al. |
| 2010/0098034 A1 | 4/2010 | Tang et al. |
| 2010/0098058 A1 | 4/2010 | Delangis |
| 2010/0098235 A1 | 4/2010 | Cadiz et al. |
| 2010/0114896 A1 | 5/2010 | Clark et al. |
| 2010/0136982 A1 | 6/2010 | Zabawskyj et al. |
| 2010/0158223 A1 | 6/2010 | Fang et al. |
| 2010/0191829 A1 | 7/2010 | Cagenius |
| 2010/0195805 A1 | 8/2010 | Zeigler et al. |
| 2010/0215153 A1 | 8/2010 | Ray et al. |
| 2010/0220840 A1 | 9/2010 | Ray et al. |
| 2010/0229452 A1 | 9/2010 | Suk |
| 2010/0246781 A1 | 9/2010 | Bradburn |

(56) References Cited

U.S. PATENT DOCUMENTS

| | | |
|---|---|---|
| 2010/0261448 A1 | 10/2010 | Peters |
| 2010/0277307 A1 | 11/2010 | Horton et al. |
| 2010/0302025 A1 | 12/2010 | Script |
| 2011/0013591 A1 | 1/2011 | Kakumaru |
| 2011/0047031 A1 | 2/2011 | Weerasinghe |
| 2011/0054689 A1 | 3/2011 | Nielsen et al. |
| 2011/0111728 A1 | 5/2011 | Ferguson et al. |
| 2011/0140868 A1 | 6/2011 | Hovang |
| 2011/0151791 A1 | 6/2011 | Snider et al. |
| 2011/0170680 A1 | 7/2011 | Chislett et al. |
| 2011/0183652 A1 | 7/2011 | Eng et al. |
| 2011/0202594 A1* | 8/2011 | Ricci .................. H04M 3/44 709/203 |
| 2011/0208822 A1 | 8/2011 | Rathod |
| 2011/0265145 A1 | 10/2011 | Prasad et al. |
| 2011/0286462 A1 | 11/2011 | Kompella |
| 2011/0320274 A1 | 12/2011 | Patil |
| 2012/0009904 A1 | 1/2012 | Modi et al. |
| 2012/0010955 A1 | 1/2012 | Ramer et al. |
| 2012/0027191 A1 | 2/2012 | Baril et al. |
| 2012/0035993 A1 | 2/2012 | Nangia |
| 2012/0036576 A1 | 2/2012 | Iyer |
| 2012/0047442 A1 | 2/2012 | Nicolaou et al. |
| 2012/0092158 A1 | 4/2012 | Kumbhar et al. |
| 2012/0099716 A1 | 4/2012 | Rae et al. |
| 2012/0116589 A1 | 5/2012 | Schneider et al. |
| 2012/0118169 A1 | 5/2012 | Hirano et al. |
| 2012/0166582 A1 | 6/2012 | Binder |
| 2012/0167086 A1 | 6/2012 | Lee |
| 2012/0177052 A1 | 7/2012 | Chen et al. |
| 2012/0178404 A1 | 7/2012 | Chin et al. |
| 2012/0180122 A1 | 7/2012 | Yan et al. |
| 2012/0213094 A1 | 8/2012 | Zhang et al. |
| 2012/0245944 A1* | 9/2012 | Gruber .................. G06F 40/40 704/270.1 |
| 2012/0265528 A1* | 10/2012 | Gruber ................. G10L 15/183 704/235 |
| 2012/0284778 A1 | 11/2012 | Chiou et al. |
| 2012/0320905 A1 | 12/2012 | Ilagan |
| 2012/0329420 A1 | 12/2012 | Zotti et al. |
| 2013/0018509 A1 | 1/2013 | Korus |
| 2013/0024197 A1* | 1/2013 | Jang .................. H04N 21/4345 704/246 |
| 2013/0035774 A1 | 2/2013 | Warren et al. |
| 2013/0038800 A1 | 2/2013 | Yoo |
| 2013/0052982 A1 | 2/2013 | Rohde et al. |
| 2013/0053005 A1 | 2/2013 | Ramer et al. |
| 2013/0070928 A1 | 3/2013 | Ellis et al. |
| 2013/0111589 A1 | 5/2013 | Cho |
| 2013/0136241 A1 | 5/2013 | Dillon et al. |
| 2013/0154822 A1 | 6/2013 | Kumar et al. |
| 2013/0162160 A1 | 6/2013 | Ganton et al. |
| 2013/0162758 A1 | 6/2013 | Shin |
| 2013/0214925 A1 | 8/2013 | Weiss |
| 2013/0229282 A1 | 9/2013 | Brent |
| 2013/0267791 A1 | 10/2013 | Halperin et al. |
| 2013/0272219 A1 | 10/2013 | Singh et al. |
| 2013/0276084 A1 | 10/2013 | Canard et al. |
| 2013/0278492 A1* | 10/2013 | Stolarz .................. G06F 3/14 345/156 |
| 2013/0288639 A1 | 10/2013 | Varsavsky Waisman-Diamond |
| 2013/0289994 A1* | 10/2013 | Newman ............... G10L 15/32 704/254 |
| 2013/0293368 A1 | 11/2013 | Ottah et al. |
| 2013/0328697 A1 | 12/2013 | Lundy |
| 2013/0336174 A1 | 12/2013 | Rubin et al. |
| 2014/0011470 A1 | 1/2014 | D'Amato et al. |
| 2014/0022915 A1 | 1/2014 | Caron et al. |
| 2014/0038536 A1 | 2/2014 | Welnick et al. |
| 2014/0066063 A1 | 3/2014 | Park |
| 2014/0084165 A1 | 3/2014 | Fadell et al. |
| 2014/0085093 A1 | 3/2014 | Mittleman et al. |
| 2014/0101082 A1 | 4/2014 | Matsuoka et al. |
| 2014/0120863 A1 | 5/2014 | Ferguson et al. |
| 2014/0129942 A1 | 5/2014 | Rathod |
| 2014/0156279 A1* | 6/2014 | Okamoto ............. H04M 3/4938 704/257 |
| 2014/0167931 A1 | 6/2014 | Lee et al. |
| 2014/0169274 A1 | 6/2014 | Kweon et al. |
| 2014/0172953 A1 | 6/2014 | Blanksteen |
| 2014/0181865 A1 | 6/2014 | Koganei |
| 2014/0191682 A1 | 7/2014 | Pederson |
| 2014/0199946 A1 | 7/2014 | Flippo et al. |
| 2014/0201571 A1 | 7/2014 | Hosek et al. |
| 2014/0206279 A1 | 7/2014 | Immendorf et al. |
| 2014/0207929 A1 | 7/2014 | Hoshino et al. |
| 2014/0222436 A1* | 8/2014 | Binder .................. G06F 3/167 704/275 |
| 2014/0229184 A1* | 8/2014 | Shires .................. G06F 3/167 704/275 |
| 2014/0244273 A1* | 8/2014 | Laroche .............. G06F 1/3206 704/275 |
| 2014/0253326 A1 | 9/2014 | Cho et al. |
| 2014/0265568 A1 | 9/2014 | Crafts et al. |
| 2014/0265920 A1 | 9/2014 | Pederson |
| 2014/0266600 A1 | 9/2014 | Alberth, Jr. et al. |
| 2014/0266699 A1 | 9/2014 | Poder et al. |
| 2014/0273912 A1 | 9/2014 | Peh et al. |
| 2014/0273979 A1* | 9/2014 | Van Os ............. H04M 3/53333 455/412.2 |
| 2014/0280870 A1 | 9/2014 | Shrivastava et al. |
| 2014/0306802 A1 | 10/2014 | Hibbs, Jr. |
| 2014/0309996 A1* | 10/2014 | Zhang .................. G10L 15/22 704/246 |
| 2014/0334645 A1 | 11/2014 | Yun et al. |
| 2014/0334653 A1 | 11/2014 | Luna et al. |
| 2014/0358666 A1 | 12/2014 | Baghaie et al. |
| 2014/0379341 A1* | 12/2014 | Seo .................. G06F 1/163 704/246 |
| 2015/0026580 A1* | 1/2015 | Kang .................. H04W 12/04 715/728 |
| 2015/0065078 A1 | 3/2015 | Mejia et al. |
| 2015/0071450 A1 | 3/2015 | Boyden et al. |
| 2015/0082451 A1 | 3/2015 | Ciancio-Bunch |
| 2015/0086001 A1 | 3/2015 | Farrand et al. |
| 2015/0087280 A1 | 3/2015 | Farrand et al. |
| 2015/0088514 A1* | 3/2015 | Typrin .................. G06F 3/167 704/249 |
| 2015/0089032 A1 | 3/2015 | Agarwal et al. |
| 2015/0100167 A1 | 4/2015 | Sloo et al. |
| 2015/0105911 A1 | 4/2015 | Slupik et al. |
| 2015/0117624 A1 | 4/2015 | Rosenshine |
| 2015/0138333 A1 | 5/2015 | DeVaul et al. |
| 2015/0145693 A1 | 5/2015 | Toriumi et al. |
| 2015/0149651 A1 | 5/2015 | Yasukawa et al. |
| 2015/0162006 A1* | 6/2015 | Kummer ........... H04N 21/47217 704/275 |
| 2015/0177114 A1 | 6/2015 | Kapoor et al. |
| 2015/0186156 A1* | 7/2015 | Brown .................. G06Q 10/10 715/706 |
| 2015/0186892 A1* | 7/2015 | Zhang ............... G06Q 20/40145 705/44 |
| 2015/0200973 A1 | 7/2015 | Nolan |
| 2015/0221207 A1 | 8/2015 | Hagan |
| 2015/0229770 A1 | 8/2015 | Shuman et al. |
| 2015/0242932 A1* | 8/2015 | Beguin .................. G06Q 30/06 705/26.8 |
| 2015/0244873 A1 | 8/2015 | Boyden et al. |
| 2015/0255071 A1 | 9/2015 | Chiba |
| 2015/0262435 A1 | 9/2015 | Delong et al. |
| 2015/0279365 A1* | 10/2015 | Sharifi .............. H04M 3/42204 704/235 |
| 2015/0281450 A1 | 10/2015 | Shapiro et al. |
| 2015/0302725 A1 | 10/2015 | Sager et al. |
| 2015/0325096 A1 | 11/2015 | Hatch |
| 2015/0327039 A1 | 11/2015 | Jain |
| 2015/0334227 A1 | 11/2015 | Whitten et al. |
| 2015/0339912 A1 | 11/2015 | Farrand et al. |
| 2015/0358795 A1 | 12/2015 | You et al. |
| 2015/0379562 A1 | 12/2015 | Spievak et al. |
| 2015/0381563 A1 | 12/2015 | Seo et al. |
| 2016/0006837 A1 | 1/2016 | Reynolds et al. |

(56) References Cited

U.S. PATENT DOCUMENTS

| | | | |
|---|---|---|---|
| 2016/0012702 A1 | 1/2016 | Hart et al. | |
| 2016/0036751 A1 | 2/2016 | Ban | |
| 2016/0036962 A1 | 2/2016 | Rand | |
| 2016/0066011 A1 | 3/2016 | Ro et al. | |
| 2016/0078750 A1 | 3/2016 | King et al. | |
| 2016/0105847 A1 | 4/2016 | Smith et al. | |
| 2016/0117684 A1 | 4/2016 | Khor et al. | |
| 2016/0142758 A1 | 5/2016 | Karp et al. | |
| 2016/0150024 A1 | 5/2016 | White | |
| 2016/0173693 A1 | 6/2016 | Spievak et al. | |
| 2016/0196596 A1 | 7/2016 | Van Wie et al. | |
| 2016/0219150 A1 | 7/2016 | Brown | |
| 2016/0232774 A1 | 8/2016 | Noland et al. | |
| 2016/0248847 A1 | 8/2016 | Saxena et al. | |
| 2016/0260431 A1* | 9/2016 | Newendorp | G10L 15/32 |
| 2016/0260436 A1* | 9/2016 | Lemay | G10L 15/28 |
| 2016/0269882 A1 | 9/2016 | Balthasar et al. | |
| 2016/0277573 A1 | 9/2016 | Farrand et al. | |
| 2016/0300260 A1 | 10/2016 | Cigich et al. | |
| 2016/0315909 A1 | 10/2016 | von Gravrock et al. | |
| 2016/0323446 A1 | 11/2016 | Farrand et al. | |
| 2016/0330069 A1 | 11/2016 | Nordmark et al. | |
| 2016/0330108 A1 | 11/2016 | Gillon et al. | |
| 2016/0330319 A1 | 11/2016 | Farrand et al. | |
| 2016/0330770 A1 | 11/2016 | Lee et al. | |
| 2016/0335677 A1* | 11/2016 | Aleksic | G10L 15/18 |
| 2016/0373372 A1 | 12/2016 | Gillon et al. | |
| 2017/0021802 A1 | 1/2017 | Mims | |
| 2017/0024995 A1 | 1/2017 | Gu et al. | |
| 2017/0034044 A1 | 2/2017 | Gillon et al. | |
| 2017/0034045 A1 | 2/2017 | Gillon et al. | |
| 2017/0034062 A1 | 2/2017 | Gillon et al. | |
| 2017/0034081 A1 | 2/2017 | Gillon et al. | |
| 2017/0084164 A1 | 3/2017 | Farrand et al. | |
| 2017/0104875 A1 | 4/2017 | Im et al. | |
| 2017/0186309 A1 | 6/2017 | Sager et al. | |
| 2017/0188216 A1 | 6/2017 | Koskas et al. | |
| 2017/0191695 A1 | 7/2017 | Bruhn et al. | |
| 2017/0270569 A1 | 9/2017 | Altberg et al. | |
| 2017/0272316 A1 | 9/2017 | Johnson et al. | |
| 2017/0293301 A1 | 10/2017 | Myslinski | |
| 2017/0339228 A1 | 11/2017 | Azgin et al. | |
| 2018/0005125 A1 | 1/2018 | Fadell et al. | |
| 2018/0013869 A1 | 1/2018 | Smelyansky | |
| 2018/0025724 A1 | 1/2018 | Hunt et al. | |
| 2018/0025733 A1 | 1/2018 | Qian et al. | |
| 2018/0061213 A1 | 3/2018 | Morehead | |
| 2018/0075540 A1 | 3/2018 | Bernard et al. | |
| 2018/0082683 A1* | 3/2018 | Chen | G06F 21/6263 |
| 2018/0152557 A1 | 5/2018 | White et al. | |
| 2018/0182380 A1* | 6/2018 | Fritz | G10L 15/22 |
| 2018/0182389 A1* | 6/2018 | Devaraj | H04L 51/046 |
| 2018/0204569 A1 | 7/2018 | Nadkar et al. | |
| 2018/0262441 A1 | 9/2018 | Gillon et al. | |
| 2018/0302334 A1 | 10/2018 | Osterlund et al. | |
| 2018/0324105 A1 | 11/2018 | Gillon et al. | |
| 2018/0336449 A1* | 11/2018 | Adan | G06F 3/167 |
| 2018/0343024 A1* | 11/2018 | Sahebjavaher | G06F 1/163 |
| 2018/0365026 A1* | 12/2018 | Jernigan | G06N 20/00 |
| 2018/0365969 A1 | 12/2018 | Krein et al. | |
| 2018/0375927 A1 | 12/2018 | Nozawa | |
| 2019/0014024 A1 | 1/2019 | Koshy | |
| 2019/0028587 A1* | 1/2019 | Unitt | G06Q 30/016 |
| 2019/0044641 A1 | 2/2019 | Trundle et al. | |
| 2019/0045058 A1 | 2/2019 | Im et al. | |
| 2019/0052752 A1 | 2/2019 | Farrand et al. | |
| 2019/0130911 A1* | 5/2019 | Hanes | G06F 1/3206 |
| 2019/0155566 A1* | 5/2019 | Dory | G06F 3/167 |
| 2019/0190942 A1 | 6/2019 | Drummond et al. | |
| 2019/0206227 A1 | 7/2019 | Farrand et al. | |
| 2019/0214011 A1* | 7/2019 | Shin | G10L 15/28 |
| 2019/0221209 A1* | 7/2019 | Bulpin | G10L 15/08 |
| 2019/0222993 A1 | 7/2019 | Maheshwari et al. | |
| 2019/0385435 A1 | 12/2019 | Farrand et al. | |
| 2020/0004989 A1 | 1/2020 | Lockhart, III et al. | |
| 2020/0074993 A1* | 3/2020 | Lee | G06F 40/30 |
| 2020/0105082 A1 | 4/2020 | Joao | |
| 2020/0126388 A1 | 4/2020 | Kranz | |
| 2020/0143663 A1 | 5/2020 | Sol | |
| 2020/0145313 A1 | 5/2020 | Raindel et al. | |
| 2020/0168073 A1 | 5/2020 | Hart et al. | |
| 2020/0186644 A1 | 6/2020 | White et al. | |
| 2020/0211562 A1* | 7/2020 | Yamazaki | G10L 17/26 |
| 2020/0219378 A1 | 7/2020 | Farrand et al. | |
| 2020/0250957 A1 | 8/2020 | Krein et al. | |
| 2020/0322283 A1 | 10/2020 | Osterlund et al. | |
| 2020/0380851 A1 | 12/2020 | Farrand et al. | |

FOREIGN PATENT DOCUMENTS

| | | | |
|---|---|---|---|
| EP | 2187574 A1 | 5/2010 | |
| EP | 3050287 A1 | 8/2016 | |
| EP | 3146516 A1 | 3/2017 | |
| EP | 3167340 A1 | 5/2017 | |
| EP | 3295620 A1 | 3/2018 | |
| EP | 3050287 B1 | 12/2018 | |
| EP | 3585011 A1 | 12/2019 | |
| EP | 3585011 B1 | 4/2021 | |
| WO | WO2015041738 A1 | 3/2015 | |
| WO | WO2015179120 A1 | 11/2015 | |
| WO | WO2016007244 A1 | 1/2016 | |
| WO | WG2016182796 A1 | 11/2016 | |
| WO | WO2018044657 A1 | 3/2018 | |

OTHER PUBLICATIONS

Das et al., An automated speech-language therapy tool with interactive virtual agent and peer-to-peer feedback (Year: 2017).*

Iannizzotto et al., A Vision and Speech Enabled, Customizable, Virtual Assistant for Smart Environments (Year: 2018).*

IP, Increased usability with virtual assistants by storing original audio when confidence is below a threshold level (Year: IP 2) (Year: 2020).*

Lisa Michaud, Observations of a New Chatbot Drawing Conclusions from Early Interactions with Users (Year: 2018).*

Rogoff et al., Voice activated GUI-the next user interface (Year: 2001).*

Zhang et al., Dangerous Skills Understanding and Mitigating Security Risks of Voice-Controlled Third-Party Functions on Virtual Personal Assistant Systems (Year: 2019).*

"International Search Report" and "Written Opinion of the International Searching Authority," Patent Cooperation Treaty Application No. PCT/US2014/044945, dated Nov. 7, 2014, 12 pages.

"International Search Report" and "Written Opinion of the International Searching Authority," Patent Cooperation Treaty Application No. PCT/US2015/029109, dated Jul. 27, 2015, 12 pages.

"International Search Report" and "Written Opinion of the International Searching Authority," Patent Cooperation Treaty Application No. PCT/US2015/034054, dated Nov. 2, 2015, 15 pages.

Life Alert. "Life Alert's Four Layers of Protection, First Layer of Protection: Protection at Home." https://web.archive.org/web/20121127094247/http://www.lifealert.net/products/homeprotection.html. [retrieved Oct. 13, 2015], 4 pages.

"International Search Report" and "Written Opinion of the International Searching Authority," Patent Cooperation Treaty Application No. PCT/US2016/030597, dated Jun. 30, 2016, 12 pages.

"Extended European Search Report," European Patent Application No. 14845956.3, dated Feb. 16, 2017, 8 pages.

"Office Action," Canadian Patent Application No. 2949211, dated Aug. 16, 2017, 4 pages.

"Office Action," Canadian Patent Application No. 2954351, dated Oct. 27, 2017, 3 pages.

"International Search Report" and "Written Opinion of the International Searching Authority," Patent Cooperation Treaty Application No. PCT/US2017/048284, dated Nov. 8, 2017, 8 pages.

"Extended European Search Report," European Patent Application No. 15796148.3, dated Jan. 8, 2018, 8 pages.

"Office Action," European Patent Application No. 14845956.3, dated Apr. 9, 2018, 4 pages.

(56) References Cited

OTHER PUBLICATIONS

"Extended European Search Report," European Patent Application No. 15818258.4, dated Feb. 26, 2018, 8 pages.
"Notice of Allowance," European Patent Application No. 14845956.3, dated Jul. 11, 2018, 7 pages.
"Notice of Allowance", Canadian Patent Application No. 2949211, dated Jul. 31, 2018, 1 page.
"Office Action," Canadian Patent Application No. 2954351, dated Aug. 22, 2018, 4 pages.
"Partial Supplementary European Search Report," European Patent Application No. 16793194.8, dated Nov. 19, 2018, 10 pages.
"Extended European Search Report," European Patent Application No. 16793194.8, dated Feb. 26, 2019, 9 pages.
"Notice of Allowance", Canadian Patent Application No. 2954351, dated Aug. 27, 2019, 1 page.
"Extended European Search Report," European Patent Application No. 19187593.9, dated Nov. 13, 2019, 8 pages.
Takahashi et al. "A Hybrid FEC Method Using Packet-Level Convolution and Reed-Solomon Codes," IEICE Transaction on Communications, Communications Society, vol. E89-B, No. 8, Aug. 1, 2006. pp. 2143-2151.
"Office Action," European Patent Application No. 15796148.3, dated Jan. 29, 2020, 6 pages.
"Office Action," European Patent Application No. 15818258.4, dated Jan. 31, 2020, 5 pages.
"Office Action," European Patent Application No. 16793194.8, dated Jun. 9, 2020, 4 pages.
"Office Action," Canadian Patent Application No. 2924631, dated Jul. 14, 2020, 5 pages.
"Office Action", European Patent Application No. 15818258.4, dated Feb. 10, 2021, 4 pages.
"Office Action", Canada Patent Application No. 3072813, dated Apr. 21, 2021, 3 pages.
"Notice of Allowance", Canada Patent Application No. 2924631, dated May 18, 2021, 1 page.
"Notice of Allowance", Eurooean Patent Application No. 16793194.8, dated May 28, 2021, 7 pages.
Smarter Home Life: "Hello Bixby Samsung Launches 5th Virtual Assistant Platform, SmartThings-embedded Wi-Fi router," [onlin], [retrieved on Jun. 18, 2020], Retrieved from the Internet: <URL: https://smarterhomelife.com/everything/2017/3/30/hello-bixby-samsung-launches-5th-virtual-assistant-platform-smartthings-embedded-wi-fi-router>.
"Notice of Allowance", European Patent Application No. 15818258.4, dated Oct. 2, 2020, 7 pages.
"Notice of Allowance", European Patent Application No. 19187593.9, dated Oct. 27, 2020, 7 pages.
"Office Action", European Patent Application No. 15796148.3, dated Dec. 8, 2020, 4 pages.

\* cited by examiner

CLOUD-BASED ASSISTIVE SERVICES FOR USE IN TELECOMMUNICATIONS AND ON PREMISE DEVICES

CROSS-REFERENCE TO RELATED APPLICATION

This application is a continuation of application Ser. No. 15/844,294, filed on Jan. 30, 2018, which is a continuation-in-part of application Ser. No. 14/327,163, filed Jul. 9, 2014, which are each hereby incorporated by reference herein in their entireties including all references and appendices cited therein, for all purposes.

TECHNICAL FIELD

The present technology relates generally to cloud-based assistive services for use in telecommunications and on premise devices.

SUMMARY

This summary is not intended to identify key features or essential features of the claimed subject matter, nor is it intended to be used as an aid in determining the scope of the claimed subject matter.

Some embodiments may include cloud computing service for providing an intelligent personal assistant service, the cloud computing service, comprising at least compute and storage capabilities to service at least one cloud resource customer, wherein the compute and storage capabilities are configured to provide an intelligent personal assistant service to the at least one cloud resource customer, the intelligent personal assistant service being configured to operate in a monitoring state to actively monitor for a first predetermined action; receive an audio stream based on communications between a first party and a second party; identify the first predetermined action from the audio stream; establish one- or two-way communications with any of the first party or the second party in response to the first predetermined action; determine a request for the intelligent personal assistant service in the one- or two-way communications; generate a result by the intelligent personal assistant service, the result being responsive to the request; provide the result to any of the first party and the second party; receive a second predetermined action from any of the first party and the second party; and return the intelligent personal assistant service to the monitoring state based on the second predetermined action.

Some embodiments may be directed to a system, comprising: an on premise device configured facilitate an audio stream between a first party and a second party; and at least compute and storage capabilities to service at least one cloud resource customer, wherein the compute and storage capabilities are configured to provide an intelligent personal assistant service to the at least one cloud resource customer, the intelligent personal assistant service being configured to: operate in a monitoring state to actively monitor for a first predetermined action in the audio stream; identify the first predetermined action from the audio stream; establish one- or two-way communications with any of the first party or the second party in response to the first predetermined action; determine a request for the intelligent personal assistant service in the one- or two-way communications; generate a result by the intelligent personal assistant service, the result being responsive to the request; provide the result to any of the first party and the second party; receive a second predetermined action from any of the first party and the second party; and return the intelligent personal assistant service to the monitoring state based on the second predetermined action.

Some embodiments may be directed to a method comprising operating in a monitoring state to actively monitor for a first predetermined action; receiving an audio stream based on communications between a first party and a second party; identifying the first predetermined action from the audio stream; establishing one- or two-way communications with any of the first party or the second party in response to the first predetermined action; determining a request for the intelligent personal assistant service in the one- or two-way communications; generating a result by the intelligent personal assistant service, the result being responsive to the request; providing the result to any of the first party and the second party; receiving a second predetermined action from any of the first party and the second party; and returning the intelligent personal assistant service to the monitoring state based on the second predetermined action.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
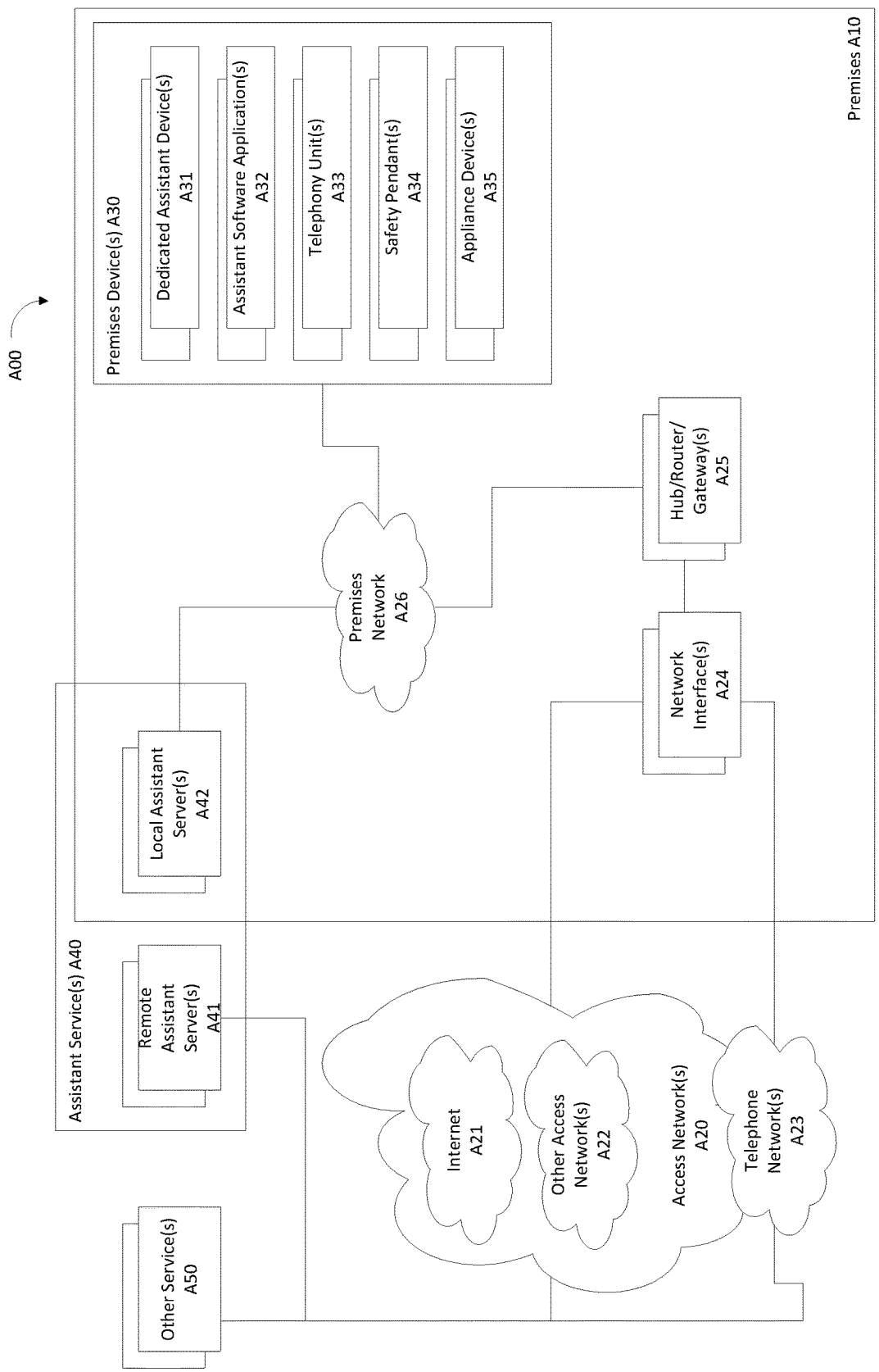
FIG. 1 is a simplified representation of a system for augmenting an appliance device with an intelligent personal assistant, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Intelligent personal assistants (also known as virtual assistants) may be used for a variety of purposes and provide a number of services.

An intelligent personal assistant ("assistant") can receive information from a user via text (e.g., online chat, instant messaging, etc.), voice (e.g., using natural language processing (NLP)), taking and/or uploading images (e.g., Samsung Bixby®), and the like. An assistant can provide information audibly (e.g., using speech synthesis). An assistant can use artificial intelligence and machine learning to provide services. In some embodiments, an assistant may be integrated into the operating system (e.g., Siri® on Apple® iOS®, Cortana® on Microsoft® Windows®, etc.) of and/or a software application (e.g., Google Assistant, etc.) running on a computing system (e.g., desktop personal computer (PC), tablet computer, smart phone, phablet, and the like); a dedicated hardware device—having at least some of the characteristics of a computing system described in relation to FIG. 7 (e.g., including one or more transducers such as a microphone (which can be disabled using a "mute" button or setting) and speaker, pushbuttons, touch sensors, indicator lights, wireless networking communications such as Wi-Fi (IEEE 802.11) and wireless broadband, and the like)—with embedded software (e.g., Amazon Alexa® on an Amazon Echo® and Amazon Echo Dot®, Google Assistant on a Google Home®, etc.); or a network-accessible service accessed via software running on a PC, tablet computer, smart phone, phablet, appliance, or similar device or via a dedicated hardware device. In some embodiments, combinations of the foregoing are used. By way of non-limiting example, a dedicated hardware device runs an (embedded) assistant and is additionally controlled/configured/monitored by the same or different assistant (e.g., complementary assistant application) running on another computing system (e.g., desktop personal computer, tablet computer, smart phone, phablet, and the like).

Services offered by an assistant can include providing voice-activated control of electronic devices and software, for example home automation and multimedia devices; accessing software-based services (e.g., internet search); answering questions asked of the service (e.g., "What is the temperature in Washington, D.C.?"); serving as a "digital personal assistant," making to-do lists, making shopping lists, dialing phones, setting alarms, setting calendar events and reminders, playing music from streaming services (e.g., Spotify, Pandora, etc.), playing radio stations; reading audiobooks, play videos, TV shows, and movies on televisions (e.g., Netflix®, Amazon® Video, YouTube®, etc.), ordering items (e.g., from a retail store, restaurant, etc.), and many other applications. The capabilities of an intelligent personal assistant ("assistant") can be expanded by services from third parties (e.g., Alexa "Skills," Google "Actions," etc.).

An assistant and the services it offers may be activated/accessed by (directly) activating it, for example, by pressing a button on a device or selecting a control in a software application (e.g., button, menu, etc. on a device). Additionally, they may also be activated by a "wake word." In such cases, some device or application is (always) listening to audio (e.g., from a microphone) and the service is activated by detection of a particular spoken wake word. By way of non-limiting example, a wake word for Amazon Alexa® is "Alexa," "Amazon," "Echo," or "Computer," a wake word for Google Assistant is "OK Google," and the like.

Assistants can have shortcomings. Assistants can be tied (limited) to a particular dedicated hardware device or platform. For example, Apple® Siri® is generally accessible only on an Apple branded smart phone, tablet, and personal computer device. Google Assistant was initially exclusively available on Google-branded smart phones. Samsung Bixby® is generally only available on Samsung branded electronics (e.g., smart phones, tablet computers, and televisions), appliances (e.g., refrigerators), and the like. Amazon Alexa® is typically interfaced via a special purpose speaker/microphone device (e.g., Amazon Echo®, Amazon Tap®, and Amazon Echo Dot®). Even if the number of devices supporting these assistants increases and the costs of these devices declines, it is often undesirable to be locked to these special devices for several reasons, including economic concerns, environmental concerns, space restrictions, and appearance concerns. These concerns may make the end user reluctant to purchase multiple purpose-built devices and distribute them in their home or workplace (premises). Rather, it is desirable for these capabilities to be incorporated into other, existing appliance devices (appliances) distributed around a premises, and to instead use these existing devices to interact with the assistant.

Additionally, new and/or enhanced capabilities are available when the number of interaction points (microphones and/or speakers) in a premises increases. To access a digital assistant, appliances (and/or dedicated devices and/or software running on phones, tablets, phablets, watches, etc.) are in many cases listening at all times, responding to a predefined wake words used to access the assistant. As these devices are constantly monitoring for specific sounds, signatures of other important sounds may be recognized (beyond the wake word to access the service) providing additional capabilities beyond those initially offered by the assistant.

In some embodiments, appliances may capture video information. Analogous to the wake words, wake "gestures" may be employed. Here, a particular motion by the user activates the service. In various embodiments, appliances may have physical and/or displayed (e.g., virtual) buttons or other interaction mechanisms allowing direct activation of the assistant.

FIG. 1 illustrates system A00 for augmenting an appliance device with an intelligent personal assistant, according to some embodiments. For example, system A00 enhances capabilities of an assistant through the use of additional sensors in appliances at and/or on premises A10. Premises A10 can be a residential building (e.g., mansion, house, condominium, townhouse, apartment, etc.), and/or a commercial building (e.g., office building, retail building, warehouse, etc.). Although depicted as a single physical structure in FIG. 1 for pictorial clarity, there can also be a logical premises spanning multiple physical locations. These multiple physical locations may be connected into a single logical location, for example, via a virtual private network (VPN).

Premises A10 can be connected to the "outside world" (e.g., physical and/or virtual resources external to premises A10) via one or more wired and/or wireless communications networks. Access network A20 can provide data connections to the outside world, and may include the Internet A21 or other access network A22. Internet A21 is any connection to the broader, public Internet or some subset thereof. Other access network A22 may be closed, proprietary networks of various types or other, non-Internet mechanisms to connect. For example, other access networks A22 may include a cellular, broadband cable, and other data connection directly to a service, not operating over the broader Internet. Additionally, there may be a connection for voice, video, and/or data over a traditional analog telephone system (plain old telephone service (POTS)), shown as telephone network A23. While (traditional) telephone network A23 could be considered an access network, it is shown here as a separate network for clarity.

Networks (e.g., access network A20, the Internet A21, other access networks A22, and telephone network A23) can be accessed via one or more network interfaces A24. Network interfaces A24 may take many forms, including an Ethernet connection, cable broadband Internet access connection, digital subscriber line (DSL) connection, fiber connection, wireless data connection (e.g., 3G, 4G, 5G, Wi-Fi, WiMAX, etc.), and the like. Network interfaces A24 may include various combinations and permutations of modems, interface cards, physical interface cables, and the like. Multiple network interface(s) may advantageously provide redundant connections, to improve performance, provide connectivity to multiple devices (e.g., cable modem, mobile phone, alarm system, eReader, etc.) on premises A10, or for other reasons.

Network interfaces A24 can be connected to one or more of hub/router/gateway A25. Hub/router/gateway A25 can provide connectivity to the devices on the premises via premises network A26, such as delivered in the form of an internal Ethernet LAN; Wi-Fi network; DECT, Bluetooth, or other low-power network services (e.g., for communications handsets, connecting to an alarm system, streaming media, and other purposes); internal analog telephone network for handsets, fax machines, etc.; or similar managed by hub/router/gateway A25. This device may optionally include additional capabilities such as firewall capabilities; network address translation (NAT) capabilities; traffic shaping capabilities; and the like.

According to some embodiments, such as for enterprise networks, premises network A26 is (directly) connected to one of access networks A20, in particular (directly) to Internet A21. Here, network interfaces A24, hub/router/gateway A25, and/or both may have minimal functionality or not be required, and premises network A26 may be directly part of one of the network(s) A20. Despite this physical difference, in such cases, the reminder of the discussion regarding the invention is not limited thereby.

According to some embodiments, network interface(s) A24 and hub/router/gateway(s) A25 are in separate (physical) devices or combined in a one (physical) device. For example, an internet service provider (ISP) may combine a modem connecting to an access network A20 with a Wi-Fi and Ethernet router, along with telephone service (e.g., provided as VoIP over access network A20 or directly over telephone network A23). Similarly, a vendor may offer a home hub device that provides a LAN network (e.g., premises network A26), firewall and NAT capabilities, along with additional services such as internet telephony (e.g., VoIP) to hard wired phones as well as phones connected over DECT, Bluetooth, or other interface mechanisms. Such a hub may directly incorporate one or more network interface(s) A24, allowing access to cable networks, 3G/4G networks, or other access networks A20 and/or to telephone network(s) A23.

Additionally, one or more premises devices A30 are present on premises A10 and can communicate with an intelligent personal assistant (assistant) service A40. Assistants (and assistant services) were described above. Assistant service A40 can provide many useful services to the end user, and enhancements to assistant service A40 are described herein.

Some portion of the functionality of assistant service A40 may be provided locally on premises devices A30. As an example, limited speech recognition may be performed locally. However the capabilities of assistant service A40 can primarily reside in or are (at a minimum) complemented by services provided by one or more server(s). More advanced/difficult speech processing, analysis of queries, and many other capabilities may reside on server(s), rather than directly in the devices accessing the service.

By way of non-limiting example, the server(s) take the form of a remote assistant server A41, located outside of the premises A10. Remote assistant server A41 may be located at a data center owned by the assistant provider, at a hosted data center, at a cloud provider, and the like.

By way of further non-limiting example, (all) the functionality of assistant service A40 may be provided by a device attached to the premises network, depicted by local assistant server A42. Local assistant server A42 may be a dedicated server providing the services of assistant service A40, located on premises (e.g., to enhance performance or security of information). Local assistant server A42 may also be physically combined with one or more premises devices A30 and/or hub/router/gateway(s) A25.

By way of further non-limiting example, assistant service A40 capabilities are provided by a combination of one or more of local processing by premises devices A30, remote assistant servers A41 and local assistant server(s) A42.

By way of further non-limiting example, some of assistant service A40 capability is provided on premises by Local Assistant Server(s) A42, while some is off site at Remote Assistant Server(s) A41.

Assistant service A40 can be reached by devices or applications requiring their services using some combination of one or more access network(s) A20, telephone network(s) A23, and premises network(s) A26.

A number of devices and software applications executing on devices (collectively devices) that make use of and/or augment the capabilities of assistant service A40 are shown connected to premises network A26. Collectively, these devices are referred to as premises devices A30. Premises devices A30 can include (dedicated) assistant devices A31, assistant software application A32, telephony unit A33, safety pendant A34, and appliance device A35.

One or more (dedicated) assistant devices A31 may make use of assistant service A40. For example, this may include a box (e.g., dedicated hardware device described above) specifically designed to listen and/or watch on the premises for requests to assistant service A40. These boxes may require a button press (or other touch on a surface of assistant device A31), or may be always listening for the wake word or watching for the wake gesture. As discussed earlier, these may be primarily intended to connect to assistant service A40 to provide services such as answering questions or controlling media, as in the case of Amazon Echo®, or may use assistant service A40 to provide voice control to other service A50, for example Samsung Smart TV®.

One or more multi-purpose computing devices, including personal computers, smart phones, tablets, phablets, and the like may also have assistant software application A32 installed that allow access to or use of the services of assistant service A40. Examples include Apple® devices with Siri® installed, or Android-based devices using the Google Assistant.

Note that the distinction between dedicated assistant device A31 and hardware devices running assistant software application(s) A32 is provided for illustrative purposes only and is non-limiting. A consumer electronics device, such as a TV, which has the capability of having new applications installed could be considered a dedicated assistant device A31, an assistant software application A32, or both.

One or more telephony units A33 can utilize and/or augment assistant service A40's services, in some embodiments. Each of telephony unit A33 is not a smart phone device running an application (e.g., these are discussed as assistant software application(s) A32), but rather a (conventional) telephony device, speakerphone, fax machine, answering machine, (DECT) wireless telephone handset, (DECT) wireless telephone base unit (phone cradle), VoIP device, video conference device, and the like. Telephony unit A33 may be connected via a wired connection (e.g., analog telephone line, Ethernet for VoIP device, etc.), a wireless connection (e.g., Wi-Fi, over a low power radio system such as DECT, etc.), and combinations thereof. Telephony unit A33 can listen at all times for a wake word using an internal microphone (e.g., using the handset, base unit, speaker phone, fax machine speaker phone, etc. capabilities). Local analysis may be performed by telephony unit A33 to recognize wake words or other sounds, audio may be provided to hub/router/gateway(s) A25 and/or to assistant service A40 to further process the audio, and combinations thereof. Alternatively or additionally, pressing a dedicated hard button on a keypad (or touch sensor) enables assistant service A40. By way of further non-limiting example, dialing a particular number sequence on the keypad accesses assistant service A40. By way of further non-limiting example, the telephony device may monitor the audio of a call in progress, and if a wake word and/or key sequence is detected, access assistant service A40. These capabilities may be provided directly in telephony unit A33, by hub/router/gateway(s) A25 controlling the device, and combinations thereof.

By way of further non-limiting example, the telephony device incorporates video capabilities, and gesture recognition is performed, either directly in telephony device(s) A33, by hub/router/gateway(s) A25 controlling the device, and combinations thereof.

One or more safety pendants A34 may utilize and/or augment assistant service A40's services in some embodiment. Safety pendant A34 can be designed to be worn by a person at risk of injury or who for other reasons may require assistance. In the event of an emergency (e.g., person needs assistance), he or she may be able to press a button on safety pendant A34 to call for help. Alternatively or additionally, safety pendant A34 listens to audio, and in the event the user is unable to press the button, wake word(s) or other sound (e.g., calls for help, screams, etc.) are recognized, allowing assistant service A40 to be used to indicate help is needed, and to provide more details about the help required, even when the individual is incapacitated. By way of further non-limiting example, safety pendant A34 incorporates video capture capabilities and watches for particular wake gestures. Additionally or alternatively, safety pendant A34 may be used as a personal access device to assistant services A40. For example, a wake word is used to access assistant service A40 for emergencies, and a different wake word activates a regular, non-emergency use of assistant service A40. By way of further non-limiting example, a third wake word may be used to contact a trusted family member, friend, neighbor, or other pre-designated contact in an emergency situation in which the user does not wish to use a conventional emergency service provider (e.g., a 911 call or call to an emergency response center). Safety pendant A34 may be desirable even to those who do not otherwise require a safety pendant, simply for assistant service A40 capabilities. By way of further non-limiting example, motion or fall sensors on safety pendant A34 can detect a fall, shake, or other sharp motion occurrence as if the wake word is sensed, activating assistant service A40 to indicate help is needed or activating simple assistant capabilities. As with the telephony unit A33 described above, local analysis may be performed by the safety pendant A34 to recognize wake words or other sounds, audio may be provided to hub/router/gateway(s) A25 or to assistant service A40 to further process the audio, and combinations thereof.

One or more appliance device(s) A35 on the premises may also utilize and/or augment assistant service A40. For example, speakers arrayed around the premises for other purposes could be used to playback audio. Microphones incorporated into existing appliances, for example security cameras, can augment assistant service A40. Wake words may be interpreted, or other capabilities, described below may be provided. Video may be captured and analyzed for wake gestures. Again, local analysis may be performed by the appliance device(s) A35 to recognize wake words, other sounds, or gestures; audio and/or video may be provided to hub/router/gateway(s) A25 or to assistant service A40 to further process the audio and/or video; and combinations thereof.

Hub/router/gateway A25 may also use and/or augment the capabilities of assistant service A40 in some embodiments, acting like one of the premises devices A30. For example, hub/router/gateway A25 provides telephony services and incorporates hardware to enable telephony unit A33 directly into hub/router/gateway A25, including microphones, speakers, cameras, and/or displays. Hub/router/gateway A25 can interact with assistant service A40 in much the same way as the telephony unit A33 (e.g., handset, base unit (cradle), etc.) discussed earlier. Hub/router/gateway A25 can incorporate microphones, speakers, and/or cameras and displays for A/V entertainment purposes, and these are used to enhance assistant service A40. Local Assistant Server A42 can be physically incorporated within the hub/router/gateway A25.

Hub/router/gateway A25 and/or one or more premises device(s) A30 may also be connected to one or more other services A50 (e.g., services that are not assistant service A40) via access network A20 and/or telephone network A23. Other services A50 can be services that provide other useful services to premises devices A30. For example, hub/router/gateway A25 provides a VoIP telephony or video communications service to end users, for example, by providing connectivity to one or more telephony devices A33 connected to hub/router/gateway A25. Hub/router/gateway A25 can connect to other service A50 to facilitate the VoIP or video service. In another example, appliance device A35 may be a video streaming device, connected to a different service of other service A50 that is a video steaming service. By way of further non-limiting example, appliance device A35 takes the form of a home alarm system, connected to a different service of other service A50 that is an alarm monitoring service.

For example, other service A50 is a telephony or other communications service provider. Because the communications service has access to both the media stream of communications sessions and keys pressed on any button keypads while using this service, the service itself (even when accessed by non-aware handsets) may recognize wake words, wake gestures, and specific keypresses, and activate access to assistant service A40. Once activated, appropriate media is redirected from the communications service to assistant service A40. In some embodiments, media is sent from devices (e.g., one of premises device A30, hub/router/gateway A25, etc.) at all times to other service A50, even when not activated, allowing other service A50 to detect wake words, wake gestures, and/or button presses (or other touches). This capability is particularly useful if legacy devices—which cannot be modified directly to enhance assistant service A40—are used. In some cases, the communications service also supports or offers the ability to use software based Internet endpoints (standalone applications, e.g., Skype, Facetime, etc.; or web-based applications (real-time applications that can be deployed in a web browser) using the IETF WEBRTC standard or similar) running on a computing device (smart phone, tablet, PC, etc.) for Internet endpoint communications.

By way of non-limiting example, other service A50 is a communications service and media from the call is directed to assistant service A40 to be processed. While in call, users speaking the wake word may activate assistant service A40 to perform tasks related to the call. By way of further non-limiting example, assistant service A40 is accessed to add or remove calendar entries during the call. By way of further non-limiting example, assistant service A40 is accessed to send a message (e.g., text message, email, and the like) to individuals inviting them to join a call. In another embodiment, assistant service A40 is asked to dial numbers or reach contacts via other means (e.g., by user name, stored directory entries, URLs, etc.) to initiate a conversation or to add them to a communications session already in progress. By way of further non-limiting example, assistant service A40 is invoked and used to make a note while communication is proceeding. By way of further non-limiting example, in a multi-party call, assistant service A40 is used to activate conference features. By way of further non-limiting example, in a call assistant service A40 is used to search the Internet and/or other local data store (e.g., intranet) by asking a question, returning information pertinent to the discussion as needed.

By way of non-limiting example, other service A50 is a multimedia service that receives audio or video information from premises devices A30 and/or hub/router/gateway(s) A25 for other reasons. Some examples include, but are not limited to, gaming applications (e.g., incorporating multimedia for communications), home entertainment applications (e.g., incorporating multimedia for streaming media or communications), virtual/immersive/augmented reality applications, alarm monitoring applications (e.g., incorporating audio sensors and/or cameras), and home automation applications. Again, because media is being sent to other service A50, other service A50 itself may detect wake words, wake gestures, and/or button presses (or other touches) in information transmitted to other service A50, and activate assistant service A40 in response to these detections, performing actions analogous to those described above. This provides the capability of adding assistant services to premises devices that would not otherwise include these capabilities, without modification of the device.

For example, a telephony device is used to provide additional access points to assistant service A40. This may be telephony unit A33 (e.g., wired, wireless (DECT or other), etc.), including a handset, base unit that controls handsets (cradle), fax machine, answering machine, speakerphone, and the like. Telephony unit A33 may also be a base unit, speakerphone, telephone headset, other telephony device, etc. incorporated into hub/router/gateway A25. Telephony unit A33 can incorporate one or more of a microphone (e.g., for a speakerphone, to program voice messages, record voice memos, etc.), a speaker, a display, a camera, buttons, touch sensors, speakers, lights, or other input or output mechanisms which may be used to augment assistant service A40. In some cases, telephony unit A33 may consist of software based Internet endpoints (standalone applications, e.g., Skype, Facetime, etc.; or web-based applications (real-time applications that can be deployed in a web browser) using the IETF WEBRTC standard or similar) running on a computing device (smartphone, tablet, PC, etc.) enabling Internet endpoint communications. Recognition of an access request based on wake word, wake gesture, button press, numeric buttons used to enter a wake code, etc. activates the device and redirects audio and/or video to assistant service A40. Processing logic for this capability (including recognition steps, as well as redirecting information to the assistant service A40 as needed) can reside in various combinations and permutations of assistant service A40, other service A50, telephony device(s) A33, and hub/router/gateway A25.

By way of further non-limiting example, one or more appliance device(s) A35 are used to provide additional access points to assistant service A40. Appliance device A35 can include many types of consumer electronic devices, including but not limited to audio/visual devices (e.g., televisions, receivers, DVD or blue ray players, speakers, radios, etc.); entertainment devices (e.g., eReaders, video game systems, electronic toys, etc.); home automation or protection devices (e.g., thermostats, alarm systems, alarm sensors, smoke detectors, heat detectors, pool monitors, CO detectors, sprinkler control units, power control systems, "smart" electrical devices (lights, light bulbs, outlets, switches, etc.), etc.); remote controls; microphones; Bluetooth headsets or speaker phones; digital cameras; musical gear; major appliances (e.g., refrigerators, dishwashers, freezers, ovens, stoves, clothes washers, clothes dryers, etc.); small appliances (e.g., coffee pots/makers, toasters, blenders, mixers, etc.); and other electronic devices that may offer any sort of input or output capability. Appliance device A35 can incorporate a microphone (e.g., for a speakerphone, to program voice messages, record voice memos, etc.), camera, buttons, touch sensors, speakers, lights, or other input or output mechanisms which may be used to augment assistant service A40. Appliance device(s) A35 can additionally or alternatively include at least some of the features and/or examples of an appliance device described in U.S. patent application Ser. No. 14/327,163, filed Jul. 9, 2014.

Recognition of an access request based on wake word, wake gesture, button press (or other touch), or numeric buttons used to enter a wake code activates the device and redirects audio and/or video to assistant service A40. Processing logic for this capability (including recognition steps, as well as redirecting information to the assistant service A40 as needed) can reside in various combinations and permutations of assistant service A40, other service A50, telephony device(s) A33, and hub/router/gateway A25.

By way of further non-limiting example, appliance device(s) A35 are provided with additional software/firmware directly in the device (e.g., via a firmware upgrade) adding the ability to communicate with assistant service A40 directly, for example, by adding software specifically enabling the capability, or by adding software making use of a software API or toolkit enabling interoperability with assistant service A40.

By way of further non-limiting example, appliance device A35 is connected to (e.g., in communication with) other service A50, which provides the logic and capabilities to send media or other information (button presses, touches, etc.) on to assistant service A40. While new software/firmware may still be used, this has the advantage of allowing an unmodified appliance devices (e.g., of appliance devices A35) to connect to assistant services. This is in alternative or addition to devices that are sending for media or other information for communications or multimedia purposes as already disclosed above.

By way of further non-limiting example, a particular numeric code, called the wake code (e.g., #55) is keyed on telephony device A33 and/or on hub/router/gateway A25 to activate assistant service A40. This key sequence (e.g., wake code) may be programmed by the user, assistant service A40, and/or by the manufacturer of the device or hub. The wake code may be a digital tone multi frequency (DTMF) code, recognized by the handset or other of telephony device A33; recognized by a base unit (e.g., standalone as a telephony unit A33 or incorporated into hub/router/gateway A25); recognized by assistant service A40; or recognized by other service A50 (e.g., a VoIP, alarm service, etc.). The key sequence may also be intercepted locally without generating actual DTMF, but having the effect of being a recognized key sequence by telephony unit A33, hub/router/gateway A25 and/or assistant service A40. Once recognized, the telephony unit A33's audio and/or video is connected/ streamed/provided to assistant service A40 without special new hardware or applications.

By way of further non-limiting example, a particular sequence of keys on appliance device A35 is pressed in a manner similar to the key sequence above, initiating a connection to assistant service A40. Again, processing may also involve other service A50 and/or hub/router/gateway(s) A25.

Figure 2:
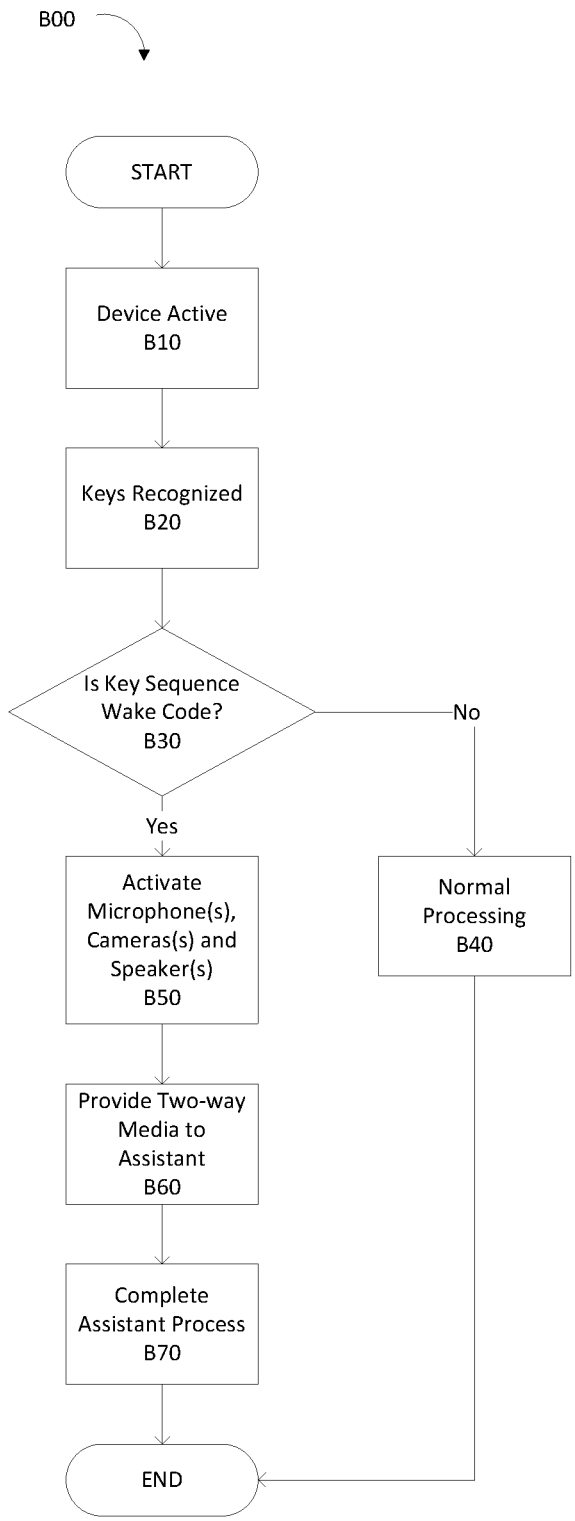
FIG. 2 is simplified flow diagram of a method for augmenting an appliance device with an intelligent personal assistant including recognizing a wake code, according to various embodiments.

FIG. 2 is a simplified flow diagram of a method B00 for recognizing a wake indication such as a key sequence. At step B10, a device (e.g., A33, A34, and/or A35) and/or hub (A25) is activated (e.g., by a user). This may be initiated by pressing a power button (or other touch upon a surface of the device), lifting a handset, pressing a call or off hook button, activating a camera, etc. In some cases, the device may always be active and step B10 is optional. At step B20, a sequence of button presses (e.g., by a user) are received and recognized. At step B30, it is determined if this key sequence matches the wake code. If not, processing of the key sequence continues normally at step B40 (e.g., the button presses may now be interpreted as dialing a phone number). According to some embodiments where the device incorporates a dedicated assistant button, pressing this button will be interpreted as the wake code in step B30.

If the key sequence is recognized as being the wake code at B30, control continues at step B50, where one or more microphones, cameras, or speakers in the device (e.g., A33, A34, A35, and/or hub A25) are activated to allow media to flow/stream to assistant service A40. At step B60, the media connection is established to assistant service A40, and the user may interact with assistant service A40. Note that other devices (e.g., Hub/Router/Gateway(s) A25, or other Services(s) A50) may be involved in processing/determining wake code and/or relaying information in steps B30-B70.

When the interaction is determined to be completed at step B70, the connection to assistant service A40 can be terminated and the device returned to normal operation (e.g., a standby state).

One skilled in the art would appreciate that telephony device A33, Safety Pendant A34, and/or appliance devices A35 may also use a single button to access assistant service A40, rather than a sequence of keys. A dedicated button to achieve the same result may be provided, and/or a programmable key or memory key may also be programmed to make the connection, either directly or by being programmed to replay the key sequence for the wake code.

Additionally or alternatively, safety pendant A34 may be configured so that one or more buttons on the safety pendant are used to access assistant service A40. In this case, the button configured to access assistant service A40 would be recognized at step B30.

In some embodiments, the key sequence is activation of a sensor. By way of further non-limiting example, Safety Pendant A34 triggers—as though a sequence of buttons has been pressed—when shaken, struck, and/or when it detects a fall. In this case, the sensor trigger is interpreted as the key pattern at Keys Recognized step B20.

Multiple different sequences and/or buttons may be used, resulting in different actions/operations. For example, safety pendant A34 may recognize one button and/or sequence to access assistant service A40 for ordinary, non-emergency purposes, while a different button and/or sequence might activate a distress or emergency response. These emergency responses may be handled by a different service (e.g., other service A50) and may even use a different network to reach that service (e.g., using telephone network(s) A23 and/or other access network(s) A22, such as an alarm network). Similarly, devices may be able to access multiple assistant service A40 or other service A50 using this mechanism.

In various embodiments, microphones and/or cameras in telephony device A33, safety pendant A34, appliance device A35, and/or in hub/router/gateway(s) A25 are always on and listening for the wake word or other sounds of interest, and/or watching for gestures or other actions of interest to assistant service A40 or other service A50. These microphones and/or cameras may be used to listen or watch at the location of the device(s) (e.g., premises A10), augmenting assistant service A40 and/or other service A50's capabilities to hear sounds or view video within premises A10. As above described above, these devices and/or the hub/router/gateway A25 can connect the user to assistant service A40 and/or other service A50 without special hardware and/or applications. As with the key sequence activation described above, detection of the wake word and/or gesture may take place in the device, hub/router/gateway(s) A25, at assistant service A40, at the other service A50, and combinations thereof.

Note that multiple wake words or gestures may be used, resulting in different actions. For example, a device may recognize one word and/or gesture to access assistant service A40 for ordinary, non-emergency purposes, while a different wake word and/or gesture might activate a distress or emergency response. These emergency responses may be handled by a different service (e.g., other service A50) and may even use a different network to reach that service (e.g., using telephone network A23 and/or other access network A22 such as an alarm network). Similarly, devices may be able to access multiple (distinct) assistant service A40 or other service A50 using this mechanism.

Figure 3:
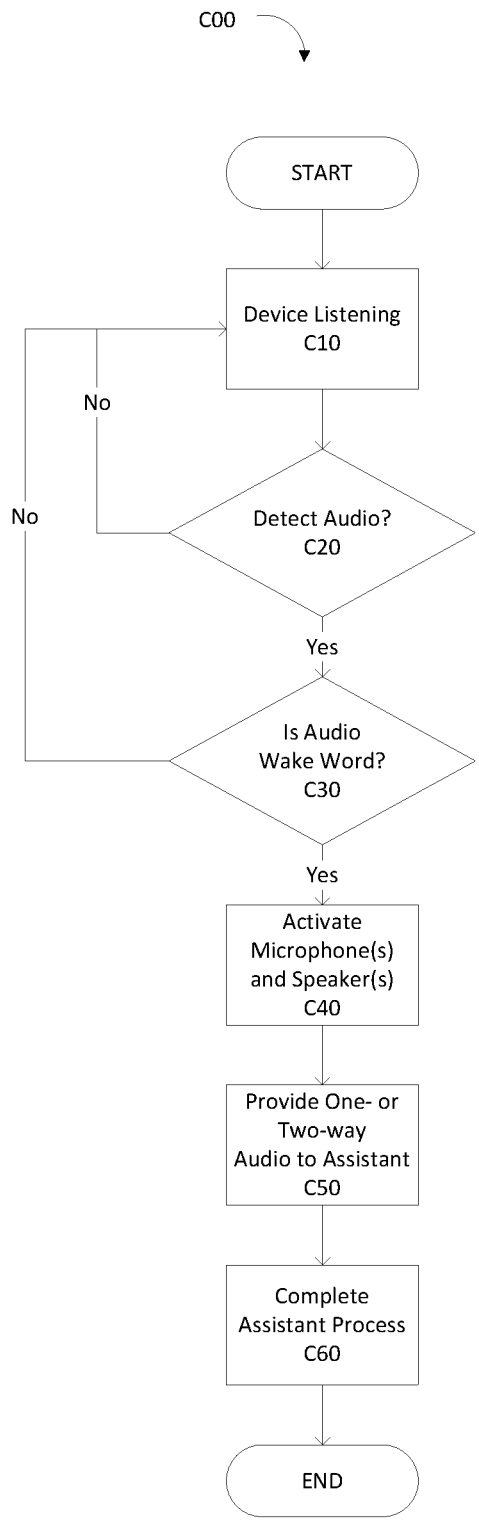
FIG. 3 is simplified flow diagram of a method for augmenting an appliance device with an intelligent personal assistant including recognizing a wake word, in accordance with some embodiments.

FIG. 3 shows a simplified flow diagram of a method C00 for a device monitoring audio, recognizing a wake indication such as a wake word, and connecting the device or hub/router/gateway to an assistant service A40. At step C10, the device (e.g., A33, A34, and A35) and/or hub/router/gateway A25 activates one or more microphones to passively listen for the wake word to be spoken. At step C20, audio is detected. Audio detected at step C20 can be checked to see if the audio is the wake word at step C30. If no audio is detected, method C00 continues to step C10 to listen for audio.

At step C30, it is determined if detected audio is the wake word. The processing to make this determination may be performed by handset A33, hub/router/gateway A25, other service A50, and/or by assistant service A40. If the detected audio is determined not to be the wake word, the device returns to listening for (further) audio at step C10.

If the audio is recognized as being the wake word at C30, method C00 continues at step C40, where one or more microphones and/or speakers in the device (e.g., A33, A34, A35, etc.) and/or hub/router/gateway A25 is activated to allow audio to flow/stream to and/or from assistant service A40.

At step C50, the audio connection is established to assistant service A40, such that the user may interact with assistant service A40 (possibly via hub/router/gateway A25 and/or other service A50).

When the interaction is determined to be complete at step C60, the connection to assistant service A40 is terminated and the device returns to normal operation (e.g., a standby state). Step C60 can comprise several sub-steps to determine the interaction with assistant service A40 is complete, including potentially recognizing another wake word, wake gesture, key sequence, etc.

The process illustrated in C00 may be performed directly by one or more of premises device(s) A30, hub/router/gateway(s) A25, other service A50, assistant service A40, or some combination thereof.

Figure 4:
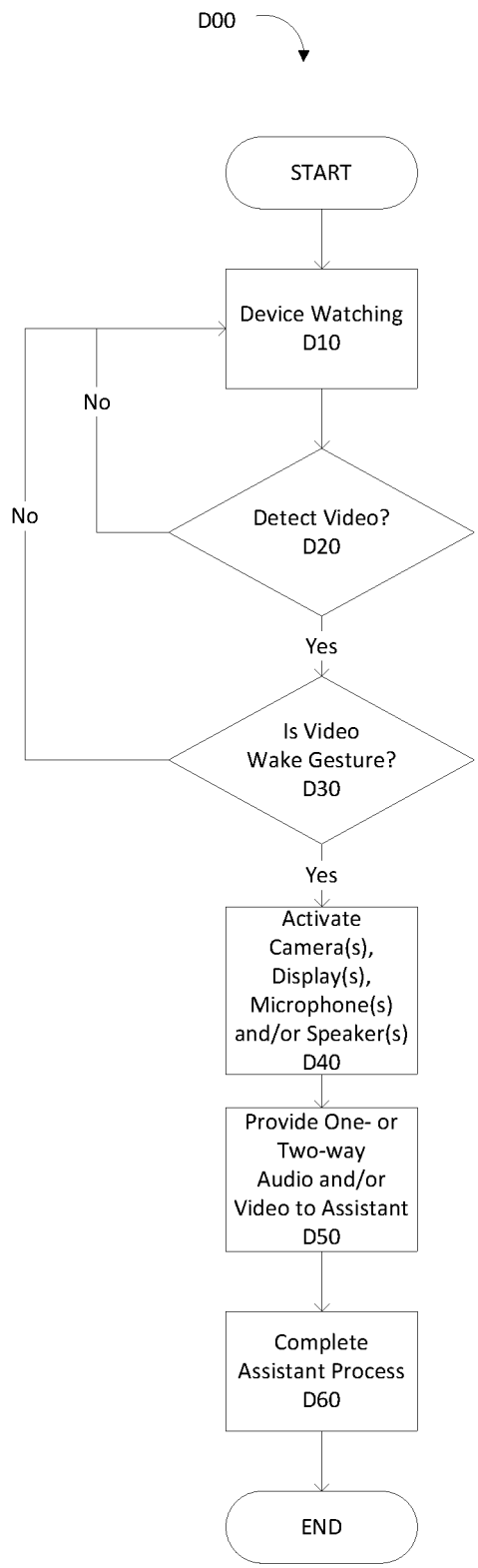
FIG. 4 is simplified flow diagram of a method for augmenting an appliance device with an intelligent personal assistant including recognizing a wake gesture, in accordance with various embodiments.

FIG. 4 is a simplified flow diagram of a method D00 for (a device) monitoring video, recognizing a wake indication such as a wake gesture, and connecting the device or hub/router/gateway to an assistant service A40. At step D10, the device (e.g., A33, A34, A35, etc.) and/or hub/router/gateway A25 activates one or more cameras to passively watch (e.g., record/sense video) for the wake gesture. At step D20, if motion is detected, video is checked to see if the wake gesture at step D30. If no motion is detected, method D00 continues to D10 to watch for motion.

At step D30, it is determined if detected video motion is the wake gesture. The processing to make this determination may be performed by the handset A33, the hub/router/gateway A25, other service A50, and/or by assistant service A40. If the gesture is determined not to be the wake gesture, the device returns to watching for new gestures at step D10.

If the gesture is recognized as being the wake gesture at D30, method D00 continues to step D40, where one or more cameras, displays, microphones, and/or speakers in the device (e.g., A33, A34, A35, etc.) and/or hub/router/gateway A25 is activated to allow video and/or audio to flow/stream to and/or from assistant service A40.

At step D50, a media connection is established to assistant service A40, and the user may interact with assistant service A4 (possibly via hub/router/gateway A25 and/or other service A50).

When the interaction is determined to be complete at step D60, the connection to assistant service A40 is terminated and the device returns to normal operation (e.g., a standby state). Determining that the interaction with assistant service A40 is complete can comprise several sub-steps, including potentially recognizing another wake word, wake gesture, key sequence, etc.

The process illustrated by method D00 may be performed directly by one or more of premises device A30, hub/router/gateway A25, other service A50, assistant service A40, and combinations thereof.

In various embodiments, both video and audio are monitored concurrently to detect words and/or gestures.

Figure 5:
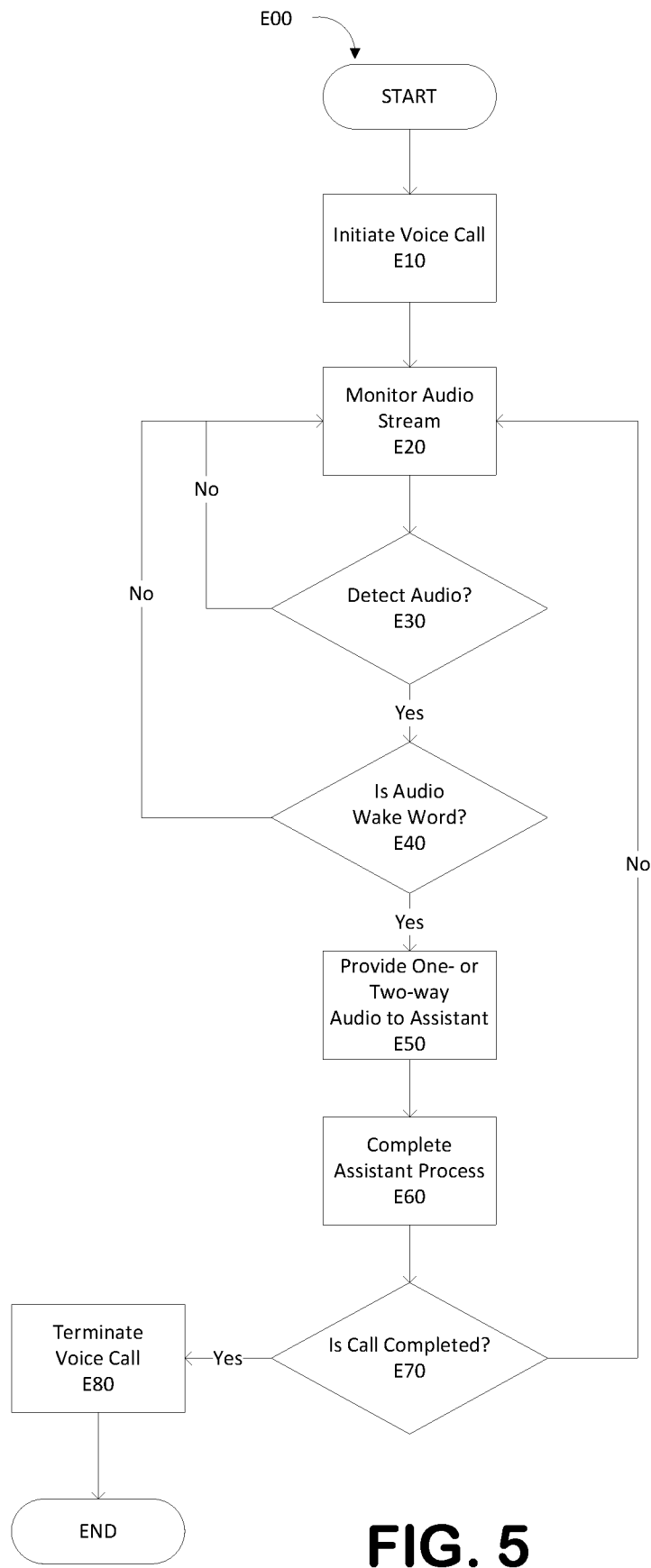
FIG. 5 is simplified flow diagram of a method for augmenting an appliance device with an intelligent personal assistant including recognizing a wake input during a call, according to some embodiments.

FIG. 5 shows a simplified flow diagram of a method E00 for monitoring for a wake word in an in-progress voice call, and connecting the device or hub/router/gateway to assistant service A40. At step E10, a voice call begins. Initiating the voice call may comprise many steps, such as initializing the device, setting up the call, connecting to the other party or parties, etc. This is not illustrated for pictorial clarity.

After establishing the call, media is streaming through one or more of the devices (e.g., A33, A34, A35, etc), hub/router/gateway A25, and/or other service A50, and optionally directly to assistant service A40, any one or more of which can passively listen for the wake word while monitoring the audio stream at step E20. At step E30, if audio is detected, it is checked to see if the audio is the wake word at step E40. If no audio is detected, method E00 continues to step E20 to continue to monitor the audio stream.

At step E40, it is determined if the detected audio is the wake word. Processing to detect the wake word may be performed by the handset A33, the hub/router/gateway A25, other service A50, by assistant service A40, and combinations thereof. If the audio is determined not to be the wake word, method E00 returns to step E20 to continue to monitor the audio stream.

If the audio is recognized as being the wake word at step E40, method E00 continues to step E50, where the audio stream is forwarded to assistant service A40 to provide one- or two-way audio between the user and assistant service A40, and the user may interact with assistant service A40. The audio stream may be relayed or otherwise processed by hub/router/gateway A25 and/or other service A50 before reaching assistant service A40.

When interaction completed at step E60, the connection to assistant service A40 is terminated and the call processing returns to normal operation. Determining that the interaction with assistant service A40 is complete can comprise sub-steps, including potentially recognizing another wake word, wake gesture, key sequence, etc.

At step E70, it is determined if the call itself has completed as well. If so, the voice call is terminated at step E80, and the process completes. If the call is still in progress, control returns to step E20 where audio may be monitored for other instances of the wake word being spoken.

The process illustrated by method E00 may be performed directly by one or more of premises devices A30, hub/router/gateways A25, other service A50, assistant service A40, and combinations thereof.

In some embodiments, in-progress video streams are monitored for gestures. In various embodiments, both video and audio are monitored concurrently to detect words, gestures, and combinations thereof. In particular, a process analogous to flow diagram E00 may be employed to detect both audio and visual (e.g., gestures) wake indications in a video communications session.

For example, software applications are created for devices that might otherwise not be intended to detect sounds and share those with assistant service A40 and/or other service A50. In these cases, any hardware device which features a microphone and which allows for new software applications (or firmware) to be installed can load the application, which will serve as an additional input device to assistant service A40 or other service A50. For example, a consumer electronic device featuring a camera (or microphone), such as a voice-controlled TV that is not normally enhanced to serve as appliance device A35, could be enhanced by a new application allowing it to serve as an additional input camera (or microphone). Similarly, smart televisions, gaming systems, etc. that would otherwise not be able to participate in listening for information to enhance assistant service A40 or other service A50 may be enabled through the addition of the new software application. Audio and or video may traverse hub/router/gateway A25 and/or other service A50 on the way to assistant service A40.

By way of further non-limiting example, software applications are created for devices (e.g., Appliance Device(s) A35) that might otherwise not be intended to capture video and share it with assistant service A40 or other service A50. In these cases, any hardware device which features a camera and which allows for new software applications to be installed can load the application, which can serve as an additional input device to assistant service A40 or other service A50. For example, a consumer electronic device featuring a camera for another use, such as a security camera, that is not normally enhanced to serve as appliance device A35 could be enhanced by a new application allowing it to serve as an additional input camera for assistant service A40 or other service A50. Similarly, smart televisions, gaming systems, etc. that would otherwise not be able to participate in watching for gesture information to enhance assistant service A40 or other service A50 may be enabled through the addition of the new software application. Audio and or video may traverse hub/router/gateway A25 and/or other service A50 on the way to assistant service A40.

By way of further non-limiting example, a number of devices (e.g., Appliance Device(s) A35) that might otherwise not be intended to capture video and/or audio and share those with assistant service A40, but which are intended to send video and/or audio to other service A50 are used. In these cases, any hardware device which sends audio or video (features a camera and/or microphone) and which transmits this information (for any reason/purpose) to other service A50 may be added as an input device for assistant service A40 by having other service A50 capture and redirect media without modification to the software on the device. For example, a consumer electronic device featuring a camera for another use, such as a security camera, that is not normally enhanced to serve as appliance device A35 could be enhanced by capturing the video as it is sent to the monitoring service (e.g., other service A50) allowing it to serve as an additional input camera for assistant service A40 or other service A50. Similarly, smart televisions, gaming systems, etc. that would otherwise not be able to participate in watching for gesture information or sharing audio information to enhance assistant service A40 or other service A50 may be enabled through the addition of the new software on the server, without modification to device or device software. Audio and or video may traverse hub/router/gateway A25 and/or other service A50 on the way to assistant service A40.

By way of further non-limiting example, a collection of devices including Dedicated Assistant Device(s) A31, Assistant Software Application(s) A32, Telephony Unit A33, Safety Pendants(s) A34 and/or Appliance Device(s) A35 are distributed about a premises (e.g., premises A10). Note that this can include Appliance Device(s) A35 not originally intended to function with an assistant service A40. These devices, working collectively, provide a much broader coverage of audio and/or video throughout the premises. Information may be streamed directly to assistant service A40, or may be intercepted by other service A50 receiving data from the devices. By monitoring which devices provide the best video or audio information, and selectively using that device as the input to assistant service A40, a much higher level of quality of service may be reached by leveraging the additional audio and/or video inputs.

By way of further non-limiting example, video and/or motion devices are used to detect where potential users may be, and pre-emptively activate the listening or video devices in those locations, improving performance of the system for obtaining audio/video information to be detected as wake words/gestures; or to pre-emptively feed the video/audio only for those locations with active users directly to other service A50.

By way of further non-limiting example, an assistant service A40 may not have open access APIs. In a very restrictive case, assistant service A40 may only allow their own proprietary hardware devices, for example a speaker/microphone unit, to interact with assistant service A40. However, (restrictive) assistance service A40 may still provide many valuable services.

By way of further non-limiting example, users interact with one or more devices (e.g., Telephony Unit(s) A33, Safety Pendants(s) A34 and/or Appliance Device(s) A35) around the premises, or even with a mobile app or communications device while off premises. Speakers on other audio output devices around the premises (e.g., Telephony Unit(s) A33, Safety Pendants(s) A34 and/or Appliance Device(s) A35) are used to play audio near the proprietary device, mimicking a user physically near the proprietary device. Microphones on nearby devices capture any responses from the proprietary device and relay the results to the end user.

In addition to listening to the wake word and establishing a connection to an assistant service A40, the devices (e.g., A33, A34, A35, other devices enhanced with application software, and combinations thereof) and/or the hub A25 (collectively "listening devices") may be used to listen for other audio signatures of interest to assistant service A40, other service A50, and combinations thereof. As before, processing of the signatures of interest may be performed locally on the devices A33/A34/A35 (or software applications on other devices), performed by the service, by the hub, and combinations thereof.

For example, sounds related to running or dripping water (e.g., faucets left on, leaking plumbing, intrusion of rain or snow melt, leaking fish tanks, or other sources) is programmed as a sound to be recognized. When such a sound is recognized, assistant service A40 or other service A50 (e.g., an alarm monitoring service) may be notified. These services then take action or inform the user of the condition. In some embodiments, there may be multiple listening devices in the premises, enabling isolation of the location of the water sound.

By way of further non-limiting example, listening devices are configured to detect the alert sounds from smoke detectors, CO detectors, freezer/refrigerator temperature alarms, moisture alarms, pool alerts, burglar alarms, medical device alerts (e.g., from oxygen monitors, EEG devices, etc.) and other similar devices, and relay the fact listening devices have heard these sounds to assistant service A40 and/or other service A50. Again assistant service A40 and/or other service A50 may then contact appropriate emergency personnel or the user. In this way, devices which are not otherwise connected to the Internet, or even to any external network may provide sensor data to be monitored. In some embodiments, there may be multiple listening devices in the premises, enabling isolation of the location of the alarm sound.

By way of further non-limiting example, listening devices are configured to detect the alert sounds from smoke detectors, CO detectors, freezer over temperature alarms, moisture alarms, pool alerts, burglar alarms, medical device alerts (e.g., from oxygen monitors, EEG devices, etc.) and other similar devices, when they create a different sound indicating battery failure or some other failure or indication of the system state. Again, detection of this sound allows this information to be relayed to assistant service A40 and/or other service A50, who can pass this information along to the end user. In some embodiments, there may be multiple listening devices in the premises, enabling isolation of the location of the device that needs attention and/or battery replacement.

By way of further non-limiting example, sounds related to vibration of a garage door opener activating is programmed as a sound to be recognized. When such a sound is recognized, assistant service A40 or other service A50 (for example, an alarm monitoring service) may be notified. These services may be able to take action, including correlating this with the locations of known users (e.g., through geolocation of their mobile devices, detection of Bluetooth information, or other means) as well as burglar alarm states, to determine if the garage door should be opening. If the door is opening at an unusual time, actions such as contacting the user, activating the burglar alarm, or contacting emergency services may be performed.

By way of further non-limiting example, listening devices are configured to detect the sounds produced by air-conditioning (A/C) units, fans, space heaters, and other appliances and devices that should not normally be left operating unattended. Again, detection of this sound allows this information to be relayed to assistant service A40 and/or other service A50, who can pass this information along to the end user; or in combination with other sensor information (e.g., burglar alarm status, motion sensors in the alarm or other devices, etc.), determine if a device has been left on by accident and perform appropriate actions accordingly. One action that could be taken is to turn the device off, if remote control or control of power supply is available. In some embodiments, there may be multiple listening devices in the premises, enabling isolation of the location of the device that needs attention and/or may be left operating.

By way of further non-limiting example, listening devices are configured to detect the signature of sounds created by glass breaking (e.g., as is done by specialized glass-break sensors), doors being forced open, etc. When detected, this fact (e.g., breaking glass) is relayed to assistant service A40 and/or other service A50, augmenting any alarm system. Again, assistant service A40 and/or other service A50 may then contact appropriate emergency personnel or the user. In some embodiments, there may be multiple listening devices in the premises, enabling isolation of the location of the suspicious sound.

By way of further non-limiting example, listening devices are configured to detect the signature of any unusually loud sound. When detected, this fact is relayed to assistant service A40 and/or other service A50, augmenting any alarm system. Again, these may then contact appropriate emergency personnel or the user, or activate other sensors (e.g., cameras, microphones, etc.) along with lights to document the situation. In some embodiments, there may be multiple listening devices in the premises, enabling isolation of the location of the suspicious sound.

By way of further non-limiting example, listening devices are configured to detect the signature of sounds created by a doorbell ringing, or knocks at a door. Again, detection of this sound allows this information to be relayed to assistant service A40 and/or other service A50, who can pass this information along to the end user; or in combination with other sensor information (e.g., burglar alarm status, motion sensors in the alarm or other devices, etc.), alert the end user that someone is at the premises, or activate other sensors (cameras, microphones) along with lights to document the situation.

By way of further non-limiting example, listening devices are configured to detect the signature of sounds created by dogs barking. Again, detection of this sound allows this information to be relayed to assistant service A40 and/or other service A50, who can pass this information along to the end user; or in combination with other sensor information (e.g., burglar alarm status, motion sensors in the alarm or other devices, etc.), alert the end user that someone is at the premises, alert authorities, or activate other sensors (e.g., cameras, microphones, etc.) along with lights to document the situation.

By way of further non-limiting example, listening devices are configured to detect the signature of a particular voice. Again, detection of this sound allows this information to be relayed to assistant service A40 and/or other service A50, who can pass this information along to the end user; track it for use by applications; and the like. For example, the voice of children of the user are identified, allowing the user to know that their children have returned to the home.

By way of further non-limiting example, listening devices are configured to detect the signature of an unknown human voice. Again, detection of this sound allows this information to be relayed to assistant service A40 and/or other service A50, who can pass this information along to the end user; in combination with other sensor information (e.g., burglar alarm status, motion sensors in the alarm or other devices, etc.), alert the end user that someone is at the premises, alert authorities, or activate other sensors (e.g., cameras, microphones, etc.) along with lights to document the situation. In some embodiments, there may be multiple listening devices in the premises, enabling isolation of the location of the voice within the premises.

By way of further non-limiting example, listening devices are configured to detect the signature of any human voice. Again, detection of this sound allows this information to be relayed to assistant service A40 and/or other service A50, who can pass this information along to the end user; or in combination with other sensor information (e.g., burglar alarm status, motion sensors in the alarm or other devices, etc.), alert the end user that someone is at the premises, alert authorities, or activate other sensors (e.g., cameras, microphones) along with lights to document the situation. In some embodiments, there may be multiple listening devices in the premises, enabling isolation of the location of the voice within the premises.

By way of further non-limiting example, listening devices are configured to detect the signature of a human voice in distress (e.g., screaming) or showing very high levels of stress. In another embodiment, signatures matching words used for distress (e.g., "help," "stop," or similar) in multiple languages are monitored. Again, detection of these sounds allows this information to be relayed to assistant service A40 and/or other service A50, who can pass this information along to the end user; or in combination with other sensor information (e.g., burglar alarm status, motion sensors in the alarm or other devices, etc.), alert the end user that someone is in distress at the premises, alert authorities, or activate other sensors (e.g., cameras, microphones, etc.) along with lights to document the situation. In some embodiments, there may be multiple listening devices in the premises, enabling isolation of the location of the voice within the premises.

By way of further non-limiting example, listening devices are configured to detect the sounds associated with a human being present or moving through the premises (e.g., breathing, footsteps, and other sounds) using multiple listening devices in the premises, enabling isolation of the location of the sound within the premises. Detection of this sound allows this information to be relayed to assistant service A40 and/or other service A50, who can use this information to offer "follow-me" functionality for their services. As an example, a media streaming service is able to detect which room the end user is in, and play the audio in that specific location. In another embodiment, the system is used to determine which rooms or locations within a structure are occupied or may have recently been occupied. In one embodiment, this information is passed to alarm services, for example to help identify which rooms are occupied or may have persons in them in the event of a burglar alarm or fire alarm. This information may be shared with authorities, users, or monitoring services. In some embodiments, this information is used to monitor for elderly or disabled persons in the home, and may provide an alert if movement is not detected in pre-defined locations within a pre-defined time. This information may be shared with authorities, users, monitoring services, etc.

By way of further non-limiting example, the listening devices are configured to profile the number of occupants, provide estimates of age and gender, identify which rooms these users are currently in or are most often in, etc. This information can be used by assistant service A40 and/or other service A50 for customization, advertising, and similar interactions.

Figure 6:
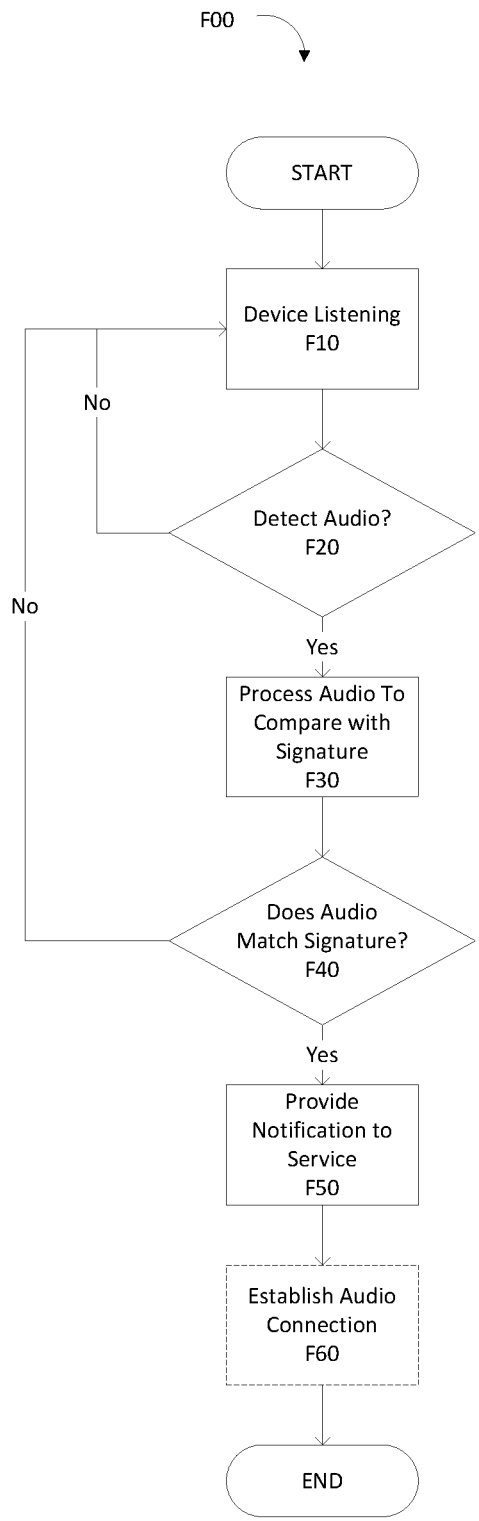
FIG. 6 is simplified flow diagram of a method for augmenting an appliance device with an intelligent personal assistant including recognizing an audio signature, according to various embodiments.

FIG. 6 is a simplified flow diagram of method F00 for listening for specific audio signatures. At step F10, a listening device begins listening for audio in the premises. At step F20, it is determined if any audio is detected. If not, method F00 returns to step F10 where the device continues to listen.

If audio is detected at step F20, method F00 can continue to step F30 where the audio is processed to compare it with the desired audio signature(s), for example the sound of glass breaking. At step F40 the audio can be compared with the signature to determine if it matches. If the audio does not match the signature, the audio is determined to be some other audio, and method F00 returns to step F10 where the device may continue listening.

If the audio signature does match the captured audio at step F40, method F00 can continue to step F50, where the fact this match has been detected is relayed to assistant service A40 and/or other service A50. Optionally, the audio stream is also forwarded to assistant service A40 and/or other service A50, allowing other actions to be taken at Step F60.

The specific actions taken by the service are not illustrated in this flow diagram, and vary depending on the type of signal detected. For example, a glass break detection might cause follow up alarm service actions to be taken, while the sound of a leaking pipe may result in notifications being provided to the user at regular intervals until the situation is resolved.

According to some embodiments, systems capable of monitoring video are used to detect changes in lighting that are not expected, for example, if lights come on in the house when the house should be empty, lights that should remain on are deactivated, or lights from flashlights or other portable lighting are detected. Again, detection of these images allows this information to be relayed to assistant service A40 and/or other service A50, who can pass this information along to the end user; alert authorities; or activate other sensors (cameras, microphones) along with lights to document the situation.

In various embodiments, speakers deployed as part of a Premises Device(s) A30 and/or Hub/Router/Gateway(s) A25 are used to play back pre-recorded sounds when the structure is non-occupied in order to give the illusion that the structure is occupied. These may be pre-recorded sounds from a manufacturer and/or from the provider of other service A50 and/or assistant service A40, or may be actual sounds from the house, mimicking the sounds of the voices of occupants, sounds of the particular resident's dog barking, etc. In some embodiments, these sounds are coupled to other home automation devices to synchronize the sounds with lights, entertainment devices, etc. In various embodiments, these sounds are controlled by a security system that triggers playback at appropriate times, for example when a motion sensor is triggered. According to some embodiments, the speaker on telephony device A33 is used for this playback.

Figure 7:
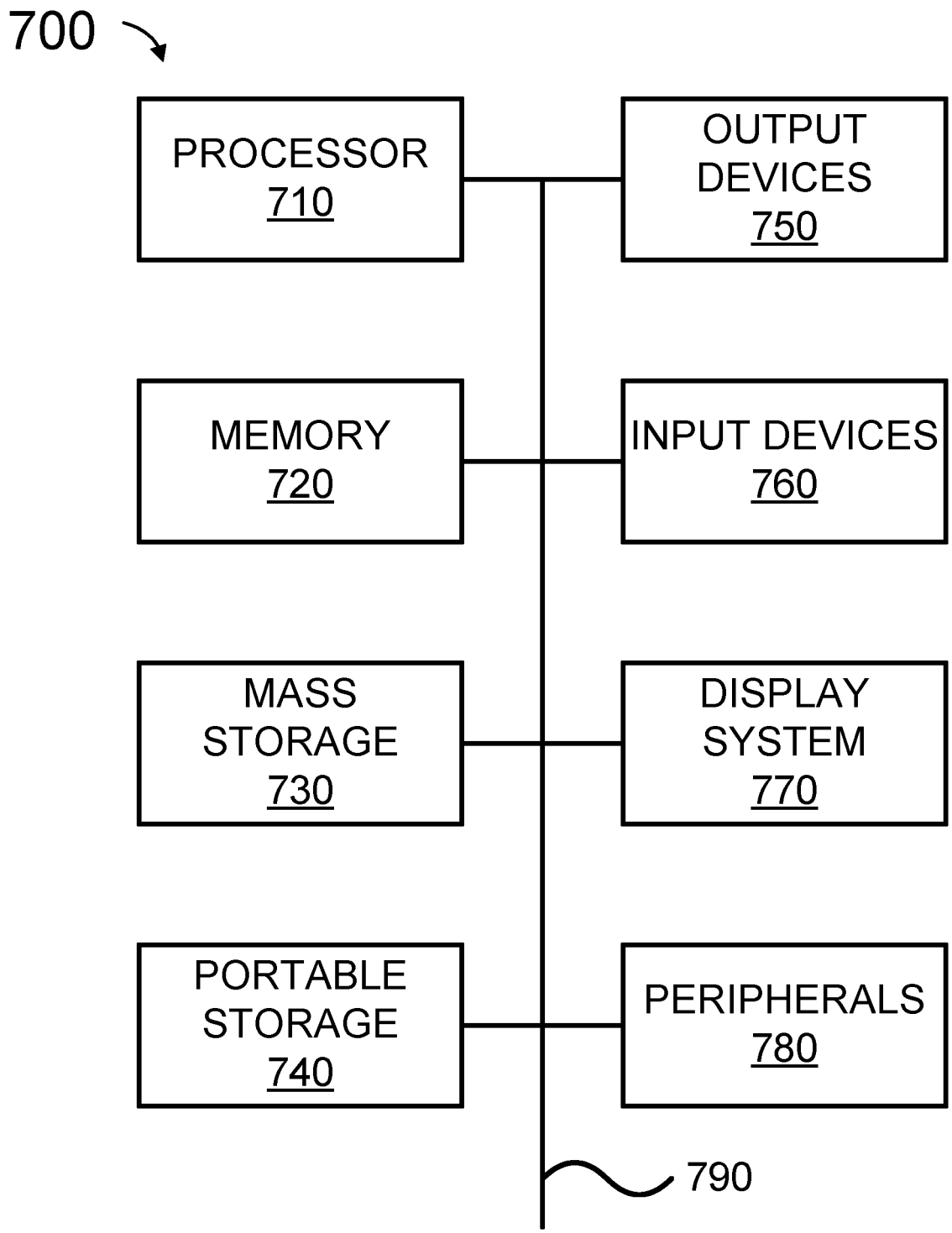
FIG. 7 is a simplified block diagram of a computing system, in accordance with some embodiments.

FIG. 7 illustrates an exemplary computer system (or computing system) 700 that may be used to implement some embodiments of the present invention. The computer system 700 in FIG. 7 may be implemented in the contexts of the likes of computing systems, networks, servers, and combinations thereof. The computer system 700 in FIG. 7 includes processor unit(s) 710 and main memory 720. Main memory 720 stores, in part, instructions and data for execution by processor unit(s) 710. Main memory 720 stores the executable code when in operation, in this example. The computer system 700 in FIG. 7 further includes a mass data storage 730, portable storage device 740, output devices 750, user input devices 760, a graphics display system 770, and peripheral device(s) 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 in FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral device(s) 780 may include any type of computer support device to add additional functionality to the computer system.

The components provided in the computer system 700 in FIG. 7 are those typically found in computer systems that may be suitable for use with embodiments of the present disclosure and are intended to represent a broad category of such computer components that are well known in the art. Thus, the computer system 700 in FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 700 may be implemented as a cloud-based computing environment, such as a virtual machine and/or container operating within a computing cloud. In other embodiments, the computing system 700 may itself include a cloud-based computing environment, where the functionalities of the computing system 700 are executed in a distributed fashion. Thus, the computing system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM).

Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of wired and/or wireless network, including a (wireless) local area network (LAN/WLAN) or a (wireless) wide area network (WAN/WWAN), or the connection may be made to an external computer (for example, through the Internet using an Internet Service Provider, wireless Internet provider, and the like).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A cloud computing service for providing an intelligent personal assistant service, the cloud computing service comprising:
    at least compute and storage capabilities to service at least one cloud resource customer, wherein the compute and storage capabilities are configured to provide an intelligent personal assistant service to the at least one cloud resource customer, the intelligent personal assistant service being configured to:
        operate in a monitoring state to actively monitor a voice call between a called party and a calling party for a first predetermined action;
        receive an audio stream based on communications between the called party and the calling party;
        identify the first predetermined action from the audio stream;
        establish a connection to provide one- or two-way communications with one of the called party or the calling party in response to the first predetermined action;
        determine a request for the intelligent personal assistant service in the one- or two-way communications;
        generate a result by the intelligent personal assistant service, the result being responsive to the request;
        provide the result to the one of the called party or the calling party;
        receive a second predetermined action from the one of the called party or the calling party; and
        terminate the connection to return the intelligent personal assistant service to the monitoring state of the voice call based on the second predetermined action.

2. The cloud computing service according to claim 1, wherein the audio stream is obtained from the voice call between the called party and the calling party.

3. The cloud computing service according to claim 1, wherein the intelligent personal assistant service is configured to determine when the audio stream has terminated.

4. The cloud computing service according to claim 1, wherein the first predetermined action and the second predetermined action comprise any of a wake word, a key sequence, or a combination thereof.

5. The cloud computing service according to claim 1, wherein the first predetermined action or the second predetermined action comprise a wake gesture, the intelligent personal assistant service being configured to:
    receive images from a camera associated with an on premise device; and
    determine the wake gesture.

6. The cloud computing service according to claim 1, further comprising an on premise device that facilitates the audio stream that is received by the cloud computing service.

7. The cloud computing service according to claim 6, wherein the on premise device is any of a telephone handset, a speaker phone, a telephone headset, and a telephone base station.

8. The cloud computing service according to claim 7, wherein the voice call is at least one of a Voice over Internet Protocol (VoIP) call over a data network, Internet endpoint communications, and a Plain Old Telephone Service (POTS) call.

9. A system, comprising:
an on premise device configured to facilitate a voice call between a first party and a second party; and
at least compute and storage capabilities to service at least one cloud resource customer, wherein the compute and storage capabilities are configured to provide an intelligent personal assistant service to the at least one cloud resource customer, the intelligent personal assistant service being configured to:
operate in a monitoring state to actively monitor for a first predetermined action in the voice call audio stream;
identify the first predetermined action from the audio stream;
establish a connection to provide one- or two-way communications with any of the first party or the second party in response to the first predetermined action, the connection being separate and distinct from the voice call;
determine a request for the intelligent personal assistant service in the one- or two-way communications;
generate a result by the intelligent personal assistant service, the result being responsive to the request;
provide the result to any of the first party and the second party using the one- or two-way communications;
receive a second predetermined action from any of the first party and the second party;
terminate the connection; and
return the intelligent personal assistant service to the monitoring state for the voice call based on the second predetermined action.

10. The system according to claim 9, wherein the on premise device is configured to:
determine an identifier for a called party;
initiate the voice call using a received identifier, the voice call being used to create the audio stream; and
terminate the voice call.

11. The system according to claim 10, wherein the identifier is at least one of a telephone number and a user identification.

12. The system according to claim 9, wherein the first predetermined action is a predetermined word for activating the intelligent personal assistant service.

13. The system according to claim 9, wherein the audio stream is provisioned over at least one of a wired data network and a wireless data network.

14. The system according to claim 9, wherein the request is for real-time information including at least one of weather, traffic, currency exchange rate, score of a sporting event, and news.

15. The system according to claim 9, wherein the request searches at least one of a calendar of the first party, a calendar of the second party, an email account of the first party, an email account of the second party, Wikipedia articles, IMDb, television schedule, movie show times, theater show times, and restaurant hours.

16. The system according to claim 9, wherein the intelligent personal assistant service creates at least one of a to-do list item, shopping list item, text message, email message, and calendar event in response to the request.

17. A method, comprising:
operating in a monitoring state to actively monitor for a first predetermined action in an audio stream obtained from a voice call between a first party and a second party;
identifying the first predetermined action in the audio stream;
establishing a connection allowing one- or two-way communications with any of the first party or the second party in response to the first predetermined action;
determining a request for an intelligent personal assistant service in the one- or two-way communications;
generating a result by the intelligent personal assistant service, the result being responsive to the request;
providing the result to any of the first party and the second party;
terminating the connection;
returning the intelligent personal assistant service to the monitoring state.

18. The method according to claim 17, further comprising determining when the voice call has terminated.

19. The method according to claim 17, wherein the first predetermined action and a second predetermined action comprise any of a wake word, a key sequence, or a combination thereof.

* * * * *